United States Patent
Izumi

(10) Patent No.: US 7,623,787 B2
(45) Date of Patent: Nov. 24, 2009

(54) WAVELENGTH DIVISION MULTIPLEXING TRANSMISSION APPARATUS USING A MULTIPLE WAVELENGTH LIGHT SOURCE

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 11/239,068

(22) Filed: Sep. 30, 2005

(65) Prior Publication Data

US 2006/0216027 A1 Sep. 28, 2006

(30) Foreign Application Priority Data

Mar. 23, 2005 (JP) .............................. 2005-082967

(51) Int. Cl.
    *H04J 14/02* (2006.01)
(52) U.S. Cl. ............................ 398/82; 398/90; 398/200
(58) Field of Classification Search .................. 398/42, 398/59, 82, 87, 90, 95, 171, 200
    See application file for complete search history.

(56) References Cited

U.S. PATENT DOCUMENTS

| | | | |
|---|---|---|---|
| 5,617,234 A * | 4/1997 | Koga et al. ..................... | 398/14 |
| 6,324,318 B1 | 11/2001 | Suzuki | |
| 6,504,638 B1 * | 1/2003 | Tanaka et al. .................. | 398/97 |
| 6,947,670 B1 * | 9/2005 | Korotky et al. ............... | 398/59 |
| 6,973,268 B1 * | 12/2005 | Thompson .................... | 398/42 |
| 2002/0078193 A1 | 6/2002 | Baumeister et al. | |
| 2002/0095547 A1 | 7/2002 | Watanabe et al. | |
| 2002/0152143 A1 | 10/2002 | Sanada et al. | |
| 2002/0152181 A1 | 10/2002 | Kanai et al. | |
| 2003/0053180 A1 * | 3/2003 | Carey .......................... | 359/181 |

FOREIGN PATENT DOCUMENTS

| | | |
|---|---|---|
| CN | 1330463 A | 1/2002 |
| EP | 1 178 407 | 6/2001 |
| EP | 1 251 424 | 10/2002 |
| JP | 4-336829 | 11/1992 |
| JP | 6-19796 | 1/1994 |
| JP | 7-177556 | 7/1995 |
| JP | 08-023308 | 1/1996 |
| JP | 8-241220 | 9/1996 |
| JP | 9-185536 | 7/1997 |
| JP | 10-40169 | 2/1998 |
| JP | 11-15732 | 1/1999 |
| JP | 11-127136 | 5/1999 |

(Continued)

OTHER PUBLICATIONS

"Centralized Control of Various Storage by a Single Console," Network World, vol. 7, No. 9, Sep. 1, 2002, pp. 154-157.

(Continued)

*Primary Examiner*—Christina Y Leung
(74) *Attorney, Agent, or Firm*—Fujitsu Patent Center

(57) ABSTRACT

One of two optical fibers connecting communication stations is used for transmitting multiple wavelength light supplied from a multiple wavelength light source supply apparatus, and the other for a bidirectional communication using optical signals of respective wavelengths generated from the multiple wavelength light. Alternatively, a transmission of multiple wavelength light and a bidirectional communication using the optical signals are enabled by only one optical fiber.

8 Claims, 19 Drawing Sheets

FOREIGN PATENT DOCUMENTS

| | | |
|---|---|---|
| JP | 11-261532 | 9/1999 |
| JP | 11-261632 | 9/1999 |
| JP | 2000-182817 | 6/2000 |
| JP | 2000-183817 | 6/2000 |
| JP | 2000-277849 | 10/2000 |
| JP | 2001-197006 | 7/2001 |
| JP | 2002-7304 | 1/2002 |
| JP | 2002-91706 | 3/2002 |
| JP | 2002-099519 | 4/2002 |
| JP | 2002-215444 | 8/2002 |
| JP | 2002-312689 | 10/2002 |
| JP | 2002-312699 | 10/2002 |
| JP | 2002-324000 | 11/2002 |
| JP | 2003-134141 | 5/2003 |
| JP | 2003-188821 | 7/2003 |

OTHER PUBLICATIONS

"Data Storage Report 2002," Computer Age, 2002, pp. 21-23, 34-35, 38 and 39.

Miller, Cliff, "Evolving Storage Whose Technology Innovation is Promoted by Demand for Network Connection," Nikkei Computer, May 6, 2002, pp. 134-141.

Negoro, Gen, "Storage Networking Virtualization," Unisys Technology Review, vol. 74, Aug. 2002, pp. 126-138.

"SNIA Virtualization Tutorials" printed Apr. 2, 2003 from www.snia.org/education/tutorials/virtualization.

"Chinese First Notification of Office Action", Complete English-language translation, mailed Aug 28, 2009 from Cn Patent Office for Corresponding Cn App. No. : 200510092923.5 X.

\* cited by examiner

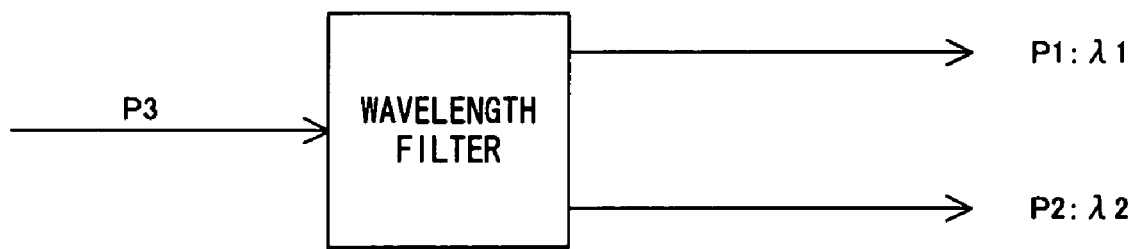
F I G. 1 E

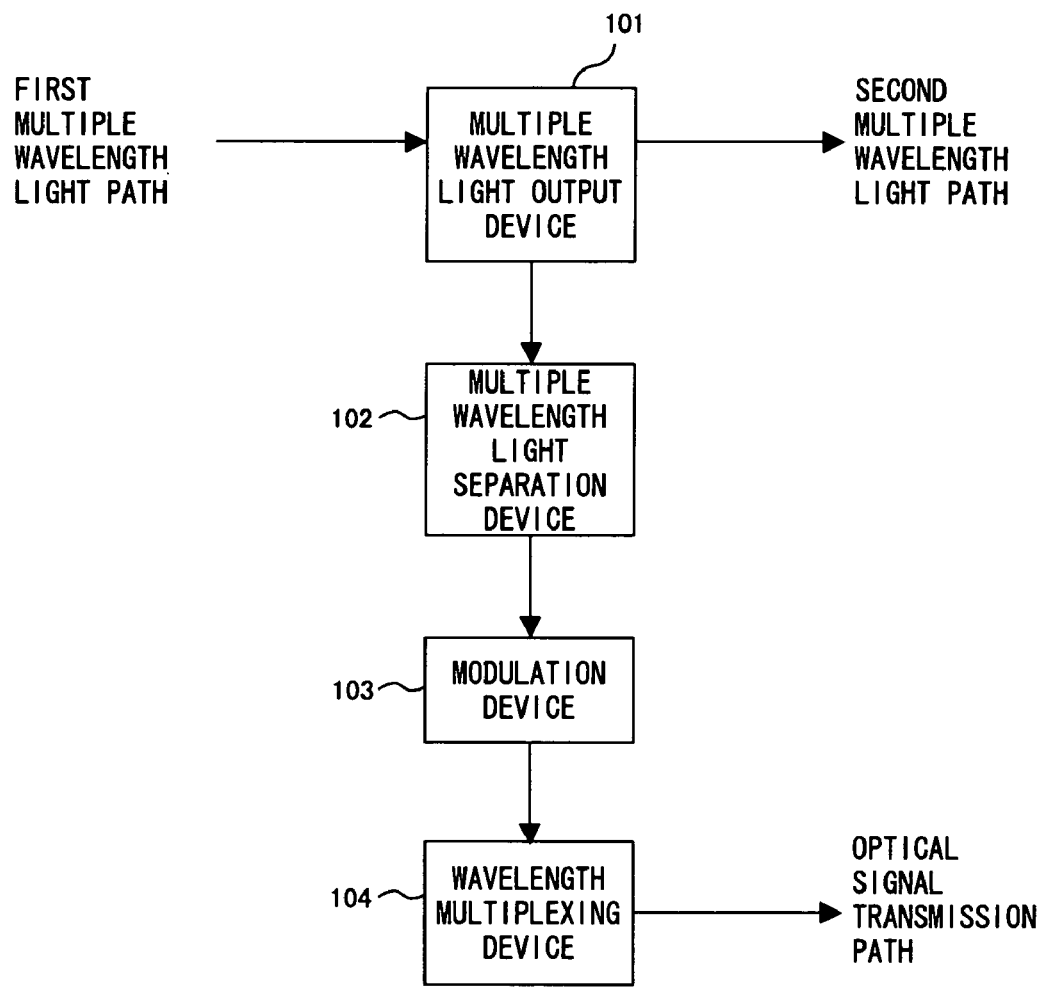
F I G. 2 A

WAVELENGTH DIVISION MULTIPLEXING TRANSMISSION APPARATUS USING A MULTIPLE WAVELENGTH LIGHT SOURCE

BACKGROUND OF THE INVENTION

1. Field of the Invention

The present invention relates to an apparatus for transmitting an optical signal by a wavelength division multiplexing using multiple wavelength light supplied from a multiple wavelength light source.

2. Description of the Related Art

Today, a communication capacity of optical communication has seen a quantum leap of increase with the commercialization of a wavelength division multiplexing, WDM) communication technique (e.g., refer to patent documents 1 through 9 listed below). With a movement of optical fibers migrating to all the transmission paths in the client systems, a further increase of communication capacities is in strong demand.

Patent document 1: Japanese patent laid-open application publication No. 2001-197006

Patent document 2: Japanese patent laid-open application publication No. 11-261532

Patent document 3: Japanese patent laid-open application publication No. 04-336829

Patent document 4: Japanese patent laid-open application publication No. 07-177556

Patent document 5: Japanese patent laid-open application publication No. 2000-277849

Patent document 6: Japanese patent laid-open application publication No. 2003-188821

Patent document 7: Japanese patent laid-open application publication No. 11-127136

Patent document 8: Japanese patent laid-open application publication No. 2000-183817

Patent document 9: Japanese patent laid-open application publication No. 08-023308

FIG. 1A shows a configuration of such a WDM transmission system. The WDM transmission system shown by FIG. 1A includes a terminal station A, a relay station B and a terminal station C. The terminal station A comprises transmission units 11-1 through 11-5, receiving units 12-1 through 12-5, and a wavelength multiplexing & separation apparatus 13-1; and the terminal station C comprises transmission units 11-16 through 11-20, receiving units 12-16 through 12-20 and a wavelength multiplexing & separation apparatus 13-4. The relay station B comprises transmission units 11-6 through 11-15, receiving units 12-6 through 12-15, wavelength multiplexing & separation apparatuses 13-2 and 13-3, and an electric ADD & DROP apparatus 14.

Each of the transmission units 11-1 through 11-20, including a light source 21 with a certain wavelength and a modulator 22, modulates light from the light source 21 by a transmission data string to generate an optical signal as shown by FIG. 1B. Each of the wavelength multiplexing & separation apparatuses 13-1 through 13-4 includes a wavelength multiplex unit 15, a wavelength separation unit 16, an optical transmission amplification unit 17 and an optical receiving amplification unit 18.

The optical signals of respective wavelengths outputted from the transmission units 11-1 through 11-5 comprised by the terminal station A are multiplexed by the wavelength multiplexing & separation apparatus 13-1 and transmitted to the relay station B as WDM light. In the relay station B, the received WDM light is separated into optical signals with respective wavelengths by the wavelength multiplexing & separation apparatuses 13-1 so as to be converted to electrical signals by the receiving units 12-1 through 12-5. The electric ADD & DROP apparatus 14 branches (i.e., drops) a part of the received signal or inserts (i.e., adds) another transmission data string thereto.

Then, a WDM light is transmitted from the relay station B to the terminal station C in the same way as the transmission from the terminal station A to the relay station B, and the optical signals of the respective wavelengths are received by the receiving units 12-16 through 12-20 therein. The procedure for the transmission from the terminal station C to the terminal station A is the same as that from the terminal station A to the terminal station C.

In such a WDM transmission system, increasing the number of wavelengths in order to increase the communication capacity of the system is relatively simple. More and more increase in wavelength band, however, makes a transmission impossible by limitations such as light amplification band, transmission band of optical fiber, bandwidths of optical devices, et cetera. This makes it necessary to increase the number of wavelengths by narrowing a wavelength interval instead of increasing the wavelength band which is limited to the most effective width.

A gain wavelength band of a commonly used multi-wavelength EDFA (erbium doped fiber amplifier) which is equipped in the optical transmission amplification unit 17 and optical receiving amplification unit 18 for each band such as L-band, C-band and S-band is approximately between 28 and 32 nm. Therefore, the number of wavelength multiplexing varies with how many wavelengths are packed within the range of the gain wavelength band as shown by FIG. 1C.

In this event, a precision of light source for the each wavelength becomes an issue as a factor to prevent an increase in the number of wavelengths. If optical signals are generated by installing a light source for each wavelength independently in the applicable transmission unit as shown by FIGS. 1A and 1B, an error $\Delta\lambda cont$ in the autonomous oscillation accuracy of each wavelength occurs as shown by FIG. 1D.

Meanwhile, a pass characteristic of an optical device (i.e., wavelength filter) such as an arrayed waveguide grating (AWG) which is used as the wavelength multiplex unit 15 and wavelength separation unit 16 will of course encounter a variation in its production.

For instance, the pass characteristic in the case of WDM light coming into a port P3 of a wavelength filter shown by FIG. 1E and optical signals of wavelengths $\lambda 1$ and $\lambda 2$ being outputted from ports P1 and P2, respectively, is as shown by FIG. 1F. In FIG. 1F, a curve 31 indicates an optical loss from the port P3 to port P1, while a curve 32 indicates that from the port P3 to port P2. In order to separate these optical signals by using a wavelength filter, the distance between the $\lambda 1$ and $\lambda 2$ needs to be no less than $\Delta\lambda filter$, taking the production variation into consideration.

Moreover, assuming that the spectrum of light expands in a modulation by $\Delta\lambda mod.$, the distance of wavelength $\Delta\lambda$ between the $\lambda 1$ and $\lambda 2$ needs to comply with the condition as follows:

$\Delta\lambda > \Delta\lambda cont + \Delta\lambda filter + \Delta\lambda mod.$ As described above, the method of narrowing the distance between wavelengths is understandably limited when considering the factors such as a wavelength accuracy of light source, a production variance of wavelength filter, et cetera. In the meantime, being investigated is a method for increasing the number of wavelengths without narrowing the distance between wavelengths by using a Raman amplification technique for widening an optical amplification bandwidth.

Besides, an increase in the number of wavelengths will require the same number of laser oscillators emitting in a precisely different wavelength and a suitable wavelength interval, resulting in the cost of the part thereof occupying the majority of that of the system.

Accordingly, a cost reduction by revisiting a configuration of light source becomes effective in an attempt to assist a quantum leap of communications capacity. One of such methods being considered is the one for a multiple wavelength light source supplying multiple wavelength light to a plurality of stations.

FIG. 1G is a configuration of WDM transmission system by using such a multiple wavelength light source. The WDM transmission system shown by FIG. 1G, vis-à-vis the configuration shown by FIG. 1A, replaces the transmission units 11-1 through 11-20 with transmission units 42-1 through 42-20; adds a wavelength separator 41-1 to the station A, wavelength separators 41-2 and 41-3 to the station B, and a wavelength separator 41-4 to the station C; adds an optical coupler 43 to the station B; and further adds a station D.

Each of the transmission units 42-1 through 42-20, being configured by removing a light source 21, vis-à-vis the configuration shown by FIG. 1B, modulates externally inputted light by a transmission data string to generate an optical signal as shown by FIG. 1H. The station D, comprising a multiple wavelength light source supply apparatus 44, supplies CW (continuous wave) light (i.e., multiple wavelength light) containing light of multiple wavelengths to the stations A through C. The optical coupler 43 added to the station B branches the supplied multiple wavelength light into two to supply the wavelength separator 41-1 with the one and the wavelength separator 41-3 with the other.

In the station A, the wavelength separator 41-1 separates the supplied multiple wavelength light into lights of the respective wavelengths to supply the transmission units 42-1 through 42-5. Each of the wavelength separator 41-2 through 41-4 added to the stations B and C likewise fills the roles of separating the multiple wavelength light supplied by the multiple wavelength light source supply apparatus 44 into lights of the respective wavelengths.

Multiple wavelength light generated by one multiple wavelength light source is capable of retaining intervals among the wavelengths even after passing through the wavelength separator 41-2 through 41-4. Therefore, there is no longer need to concern with the above described error $\Delta\lambda$cont in the oscillation accuracy. And there is no need to equip a laser oscillator with every transmission unit, hence enabling a reduced cost for the light source part as an overall system.

Meanwhile, the recent years have seen a commercialization of a photonic crystal fiber, PCF, which is suitable to a multiple wavelength simultaneous transmission and a development of multiple wavelength batch conversion technique such as one being represented by a periodically poled lithium niobate, PPLN, as a multiple wavelength conversion element. A method for utilizing these new techniques is in undeveloped regions and a future market expansion is expected.

The above described WDM transmission system by using a multiple wavelength light source, however, has been faced with the problem as follows. The system shown by FIG. 1G needs to add more optical fibers by the number of stations for supplying multiple wavelength light to each station, hence magnifying the cost therefor. Also, if a supply of light from the multiple wavelength light source is interrupted, then the station is cut off from all the communications, since the light source is not installed in each of the stations.

SUMMARY OF THE INVENTION

A first object of the present invention is to suppress a cost of adding an optical fiber for supplying multiple wavelength light in a WDM transmission system by using a multiple wavelength light source.

A second object of the present invention is to secure a reliability of communication in the case of the supply of the multiple wavelength light being interrupted in a WDM transmission system using a multiple wavelength light source.

A first transmission apparatus according to the present invention, comprising a multiple wavelength light output device, a multiple wavelength light separation device, a modulation device and a wavelength multiplexing device, transmits an optical signal through a wavelength division multiplexing by using multiple wavelength light supplied from a multiple wavelength light source.

The multiple wavelength light output device outputs multiple wavelength light generated by the multiple wavelength light source, or incident multiple wavelength light from a first multiple wavelength light transmission path, to a second multiple wavelength light transmission path. The multiple wavelength light separation device separates the multiple wavelength light into lights of the respective wavelengths, and the modulation device generates an optical signal by modulating each of the separated lights of the respective wavelengths by a transmission data string. The wavelength multiplexing device multiplexes a plurality of optical signals having different wavelengths to output to an optical signal transmission path.

A second transmission apparatus according to the present invention, comprising a multiple wavelength light output device, a conversion device, a multiple wavelength light separation device, a modulation device and a wavelength multiplexing device, transmits an optical signal through a wavelength division multiplexing by using multiple wavelength light supplied from a multiple wavelength light source.

The multiple wavelength light output device outputs incident multiple wavelength light from the multiple wavelength light source, or a first transmission path, to a second transmission path. The conversion device converts respective wavelengths of the multiple wavelength light in the lump, and the multiple wavelength light separation device separates the converted multiple wavelength light into lights of the respective wavelengths. The modulation device generates an optical signal by modulating each of the separated lights of respective wavelengths by a transmission data string, and the wavelength multiplexing device multiplexes a plurality of optical signals having different wavelengths to output to the second transmission path.

A third transmission apparatus according to the present invention, comprising first and second multiple wavelength light output devices, a conversion device, first and second multiple wavelength light separation devices, first and second modulation devices, and first and second wavelength multiplexing devices, transmits an optical signal through a wavelength division multiplexing by using multiple wavelength light supplied from a multiple wavelength light source.

The first multiple wavelength light output device outputs incident first multiple wavelength light from the multiple wavelength light source, or a first transmission path, to a second transmission path, and the second multiple wavelength light output device outputs incident second multiple wavelength light from the multiple wavelength light source, or a second transmission path, to the first transmission path. The conversion device converts respective wavelengths of the first and second multiple wavelength lights in the lump.

The first multiple wavelength light separation device separates the converted first multiple wavelength light into lights of the respective wavelengths, and the second multiple wavelength light separation device separates the converted second multiple wavelength light into lights of the respective wavelengths. The first modulation device generates an optical signal by modulating each of the lights of the respective wavelengths, by a transmission data string, which has been separated by the first multiple wavelength light separation device, and the second modulation device generates an optical signal by modulating each of the light of the respective wavelengths, by a transmission data string, which has been separated by the second multiple wavelength light separation device.

The first wavelength multiplexing device multiplexes a plurality of optical signals having different wavelengths generated by the first modulation device to output to the first transmission path, and the second wavelength multiplexing device multiplexes a plurality of optical signals having different wavelengths generated by the second modulation device to output to the second transmission path.

BRIEF DESCRIPTION OF THE DRAWINGS

FIG. 1E shows a wavelength filter;
FIG. 2A shows the principle of a transmission apparatus according to the present invention.

DESCRIPTION OF THE PREFERRED EMBODIMENTS

Figure 1A:
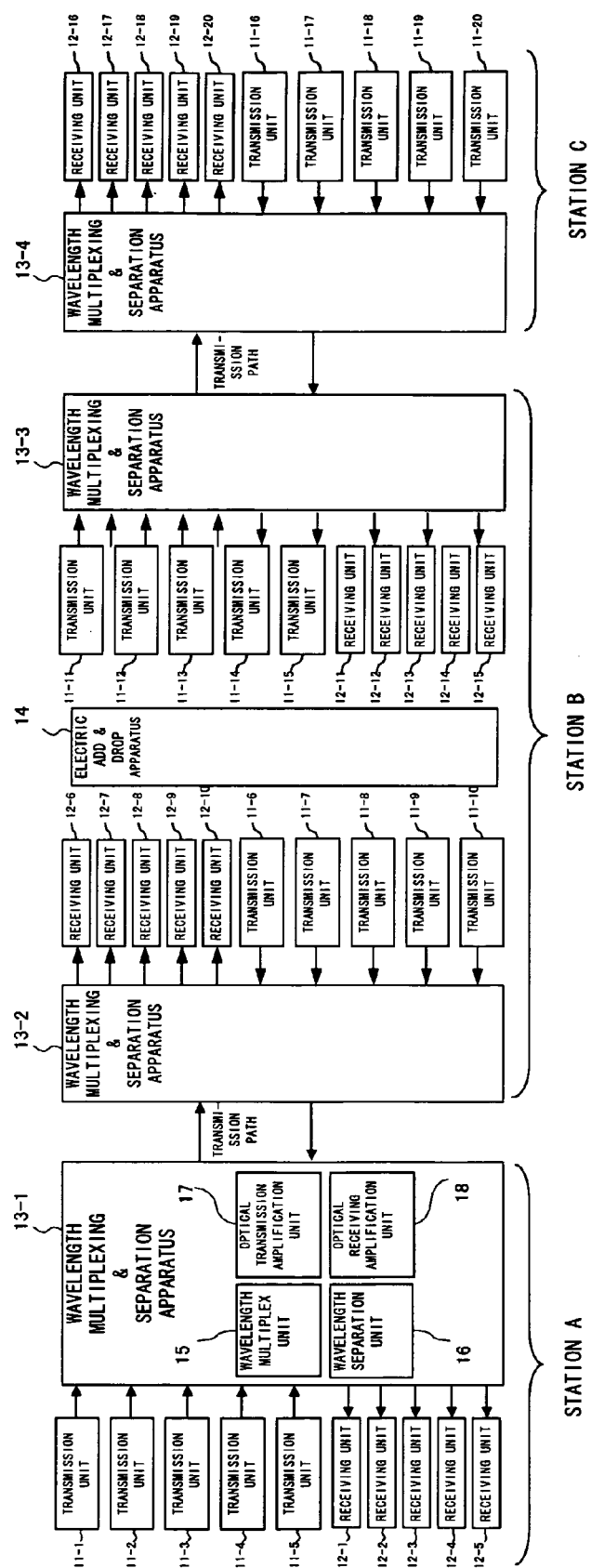
FIG. 1A shows a configuration of WDM transmission system using a light source for each wavelength.
Figure 1B:
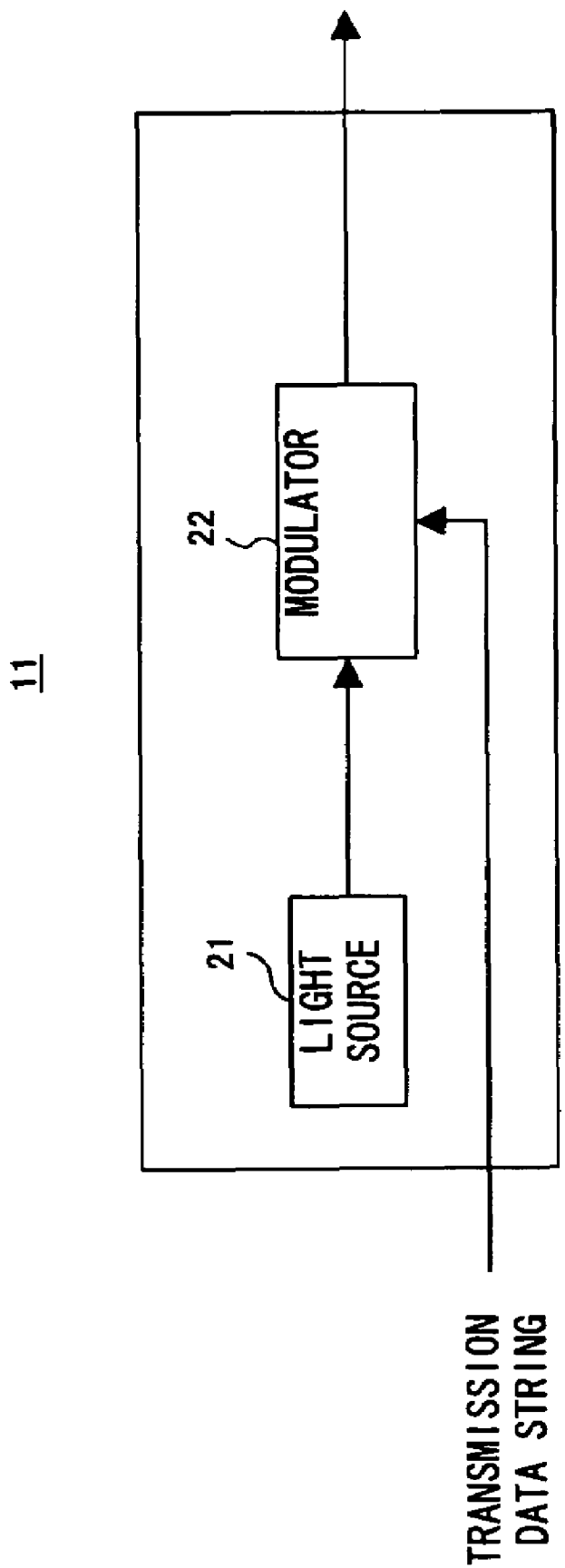
FIG. 1B shows a configuration of a first transmission unit.

The following is a detailed description of the preferred embodiment of the present invention while referring to the accompanying drawings.

FIG. 2A shows the principle of a first transmission apparatus according to the present invention. The first transmission apparatus shown by FIG. 2A, comprising a multiple wavelength light output device 101, a multiple wavelength light separation device 102, a modulation device 103 and a wavelength multiplexing device 104, transmits an optical signal through a wavelength division multiplexing by using multiple wavelength light supplied from a multiple wavelength light source.

The multiple wavelength light output device 101 outputs multiple wavelength light generated by a multiple wavelength light source, or incident multiple wavelength light coming from a first multiple wavelength light transmission path, to a second multiple wavelength light transmission path. The multiple wavelength light separation device 102 separates multiple wavelength light into lights of the respective wavelengths, and the modulation device 103 generates an optical signal by modulating each of the separated lights of the respective wavelengths by a transmission data string. The wavelength multiplexing device 104 multiplexes a plurality of optical signals having different wavelengths to output to an optical signal transmission path.

The comprisal of multiple wavelength light output device 101 makes it possible to supply a next transmission apparatus connected to the second multiple wavelength light path with the multiple wavelength light supplied to the first transmission apparatus. Accordingly, this eliminates a need to furnish an optical fiber one for one for supplying each transmission apparatus with multiple wavelength light from the multiple wavelength light source.

And the comprisal of the multiple wavelength light separation device 102, modulation device 103 and wavelength multiplexing device 104 makes it possible to generate WDM light for data transmission by taking light of each wavelength out of the supplied multiple wavelength light and by modulating it.

For instance, a use of optical signal transmission path as a transmission path for a bidirectional communication enables a building up of WDM transmission system while reducing the resources such as the number of light source, a multiple wavelength light transmission path, et cetera, by merely connecting between adjacent transmission apparatuses by two transmission path, i.e., a multiple wavelength light transmission path and an optical signal transmission path.

The multiple wavelength light output device 101 corresponds to a later described optical amplifier 503, optical couplers 504-1 and 504-2, and selector 501-2, all shown by FIG. 5, for example; and the multiple wavelength light separation device 102 corresponds to a wavelength separation unit 502 shown by FIG. 5 for example. The modulation device 103 corresponds to modulators 511-1 through 511-4 shown by FIG. 5 for example and the wavelength multiplexing device 104 corresponds to wavelength multiplexing units 509-1 and 509-2 shown by FIG. 5 for example.

A second transmission apparatus according to the present invention, comprising a multiple wavelength light output device, a conversion device, a multiple wavelength light separation device, a modulation device and a wavelength multiplexing device, transmits an optical signal through a wavelength division multiplexing by using multiple wavelength light supplied from a multiple wavelength light source.

The multiple wavelength light output device outputs incident multiple wavelength light coming from a multiple wavelength light source, or a first transmission path, to a second transmission path. The conversion device converts respective wavelengths of the multiple wavelength light in the lump, and the multiple wavelength light separation device separates the converted multiple wavelength light into lights of the respective wavelengths. The modulation device generates an optical signal by modulating each of the separated lights of the respective wavelengths by a transmission data string, and the wavelength multiplexing device multiplexes a plurality of optical signals having different wavelengths to output to a second transmission path.

A conversion of each wavelength contained in multiple wavelength light into a different wavelength by the conversion device and a generation of WDM light by using the converted multiple wavelength light for a data communication enable a transmission of the multiple wavelength light and WDM light through the same second transmission path.

Therefore, a use of the first and second transmission paths as a transmission path for a bidirectional communication enables a building up of WDM transmission system merely by connecting adjacent transmission apparatuses by one transmission path.

The multiple wavelength light output device corresponds to later described wavelength filters 706-1, 706-2, 707-1 and 707-2, optical amplifier 704, optical couplers 705-1 and 705-2, and selector 701-2, all shown by FIG. 7 for example; the conversion device corresponds to a wavelength converter 702 shown by FIG. 7 for example; and the multiple wavelength light separation device corresponds to a wavelength separation unit 703 shown by FIG. 7 for example. The modulation device corresponds to modulators 713-3 and 713-4 shown by FIG. 7 for example; and the wavelength multiplexing device corresponds to a wavelength multiplexing unit 711-2 shown by FIG. 7 for example.

A third transmission apparatus according to the present invention, comprising first and second multiple wavelength light output devices, a conversion device, first and second multiple wavelength light separation devices, first and second modulation devices, and first and second wavelength multiplexing devices, transmits an optical signal through a wavelength division multiplexing by using multiple wavelength light supplied from a multiple wavelength light source.

The first multiple wavelength light output device outputs incident first multiple wavelength light coming from a multiple wavelength light source, or a first transmission path, to a second transmission path, and the second multiple wavelength light output device outputs incident second multiple wavelength light coming from the multiple wavelength light source, or a second transmission path, to the first transmission path. The conversion device converts respective wavelengths of the first and second multiple wavelength lights in the lump.

The first multiple wavelength light separation device separates the converted first multiple wavelength light into lights of the respective wavelengths, and the second multiple wavelength light separation device separates the converted second multiple wavelength light into lights of the respective wavelengths. The first modulation device generates an optical signal by modulating each of the lights of the respective wavelengths, by a transmission data string, which has been separated by the first multiple wavelength light separation device, and the second modulation device generates an optical signal by modulating each of the lights of the respective wavelengths, by a transmission data string, which has been separated by the second multiple wavelength light separation device.

The first wavelength multiplexing device multiplexes a plurality of optical signals having different wavelengths generated by the first modulation device to output to the first transmission path, and the second wavelength multiplexing device multiplexes a plurality of optical signals having different wavelengths generated by the second modulation device to output to the second transmission path.

WDM light to be outputted to the first transmission path is generated from the incident first multiple wavelength light coming from the first transmission path, and WDM light to be outputted to the second transmission path is generated from the incident second multiple wavelength light coming from the second transmission path. This makes it possible to continue a data transmission in the second transmission path by using the second multiple wavelength light even if a supply of the first multiple wavelength light is interrupted due to a severance of the first transmission path. Conversely, it is possible to continue a data transmission in the first transmission path by using the first multiple wavelength light even if a supply of the second multiple wavelength light is interrupted due to a severance of the second transmission path.

Therefore, the reliability of the WDM transmission system is considerably secured even if adjacent transmission apparatuses are connected by one transmission path.

The first multiple wavelength light output device corresponds to later described wavelength filters 806-1, 806-2, 807-1 and 808-2, an optical amplifier 804-1, optical couplers 805-1 and 805-2, and a selector 801-2, all shown by FIG. 8 for example. The second multiple wavelength light output device corresponds to wavelength filters 806-1, 806-2, 807-2 and 808-1, an optical amplifier 804-2, optical couplers 805-3 and 805-4, and a selector 801-4, all shown by FIG. 8 for example.

Figure 8:
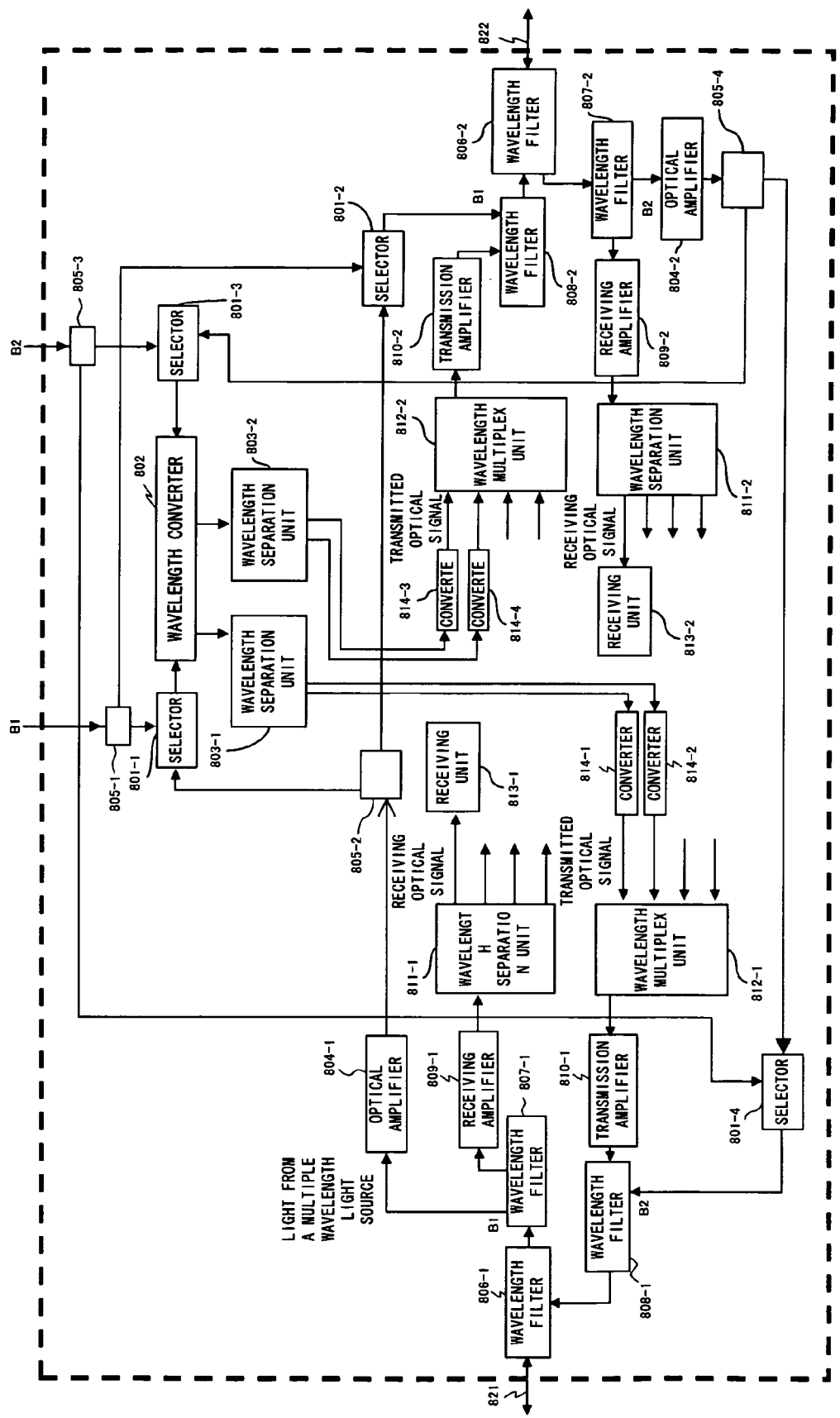
FIG. 8 shows a comprisal of a third transmission apparatus.

The conversion device corresponds to a wavelength converter 802 shown by FIG. 8 for example, the first and second wavelength separation units corresponds to wavelength separation units 803-1 and 803-2, respectively, shown by FIG. 8 for example. The first modulation device corresponds to modulators 814-1 and 814-2 shown by FIG. 8 for example, and the second modulation device corresponds to modulators 814-3 and 814-4 shown by FIG. 8 for example. The first and second wavelength multiplexing units correspond to wavelength multiplexing units 812-1 and 812-2, respectively, also shown by FIG. 8.

The present invention accomplishes a building up of large capacity WDM transmission by using a multiple wavelength light source in a low cost without requiring an addition of optical fiber for connecting the multiple wavelength light source and each transmission apparatus. Moreover, the supply of multiple wavelength lights from two directions makes it possible to continue a communication by using multiple wavelength light from one direction even if multiple wavelength light from the other is interrupted.

Figure 2B:
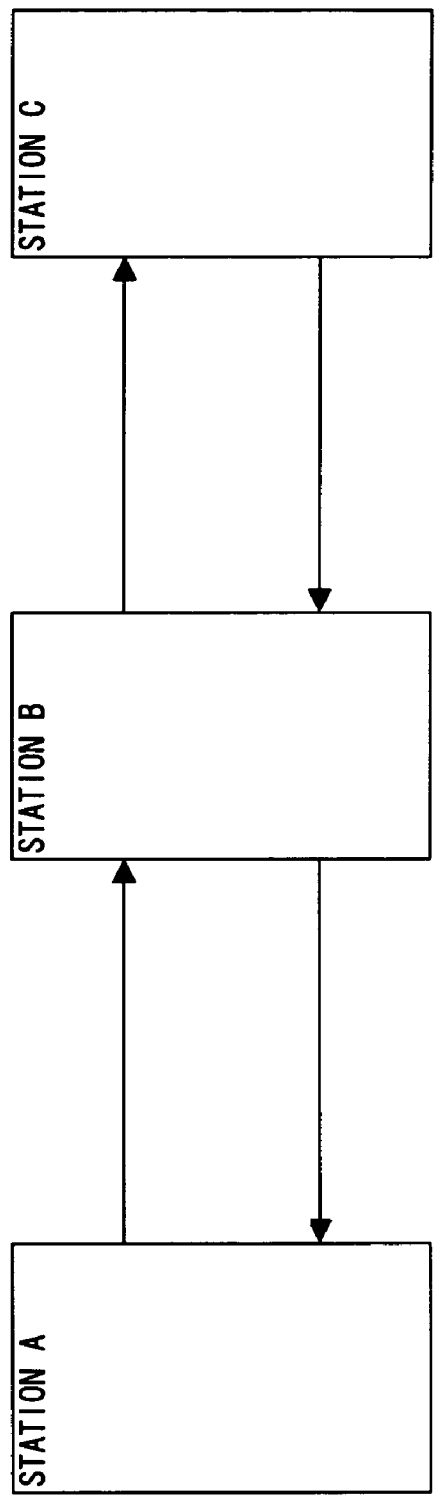
FIG. 2B shows a connection by two optical fibers.

As shown by FIG. 2B, a common optical communication carries out the communications by interconnecting adjacent communications stations by two optical fibers. In this case, a different optical fiber is used for each direction of communication. If a bidirectional communication is carried out by using one of the two for the communication and the other for a supply of light, it becomes possible to secure a transmission path for supplying multiple wavelength light without adding an optical fiber.

Figure 3:
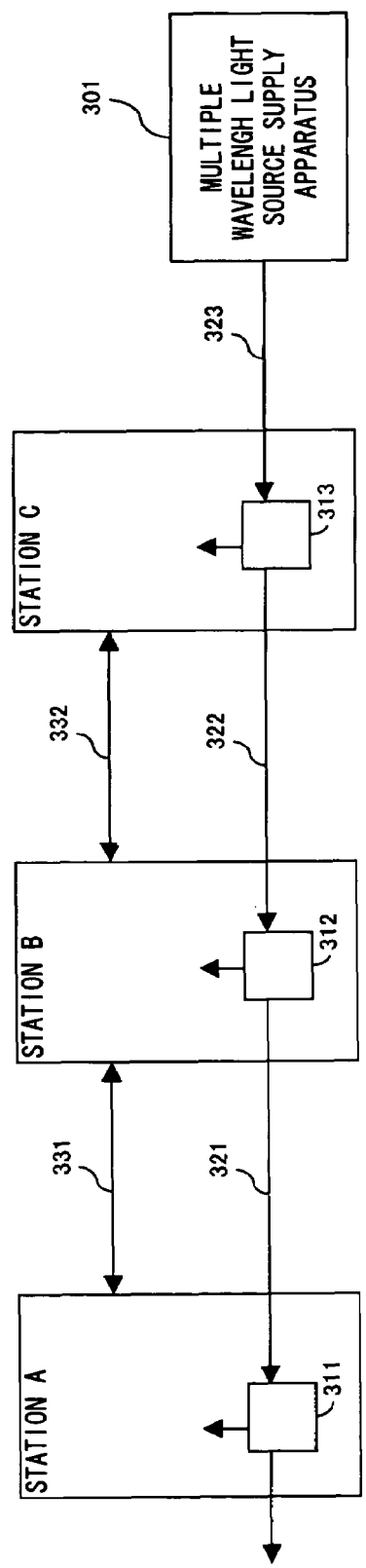
FIG. 3 shows a comprisal using a multiple wavelength light source.

FIG. 3 exemplifies a comprisal of such a WDM transmission system. A multiple wavelength light source supply apparatus 301 installed in the station C generates reference multiple wavelength light by multiplexing wavelength lights for transmitting leftward (i.e., direction of stations going from C to A) with wavelength lights for transmitting rightward (i.e., direction of stations going from A to C) and supplies the stations A through C by way of optical fibers 321 through 323. The stations A through C carry out communications by way of the optical fibers 331 and 332, and optical couplers 311 through 313 by using the supplied multiple wavelength light.

In this event, the communication-use optical fibers 331 and 332 both propagate bidirectional lights so that each station selects light of different wavelength depending on the direction of communication. For instance, the band of the reference multiple wavelength light is divided into two bands so as to use the lights of the mutually different bands for optical communication between the leftward and rightward.

Figure 4:
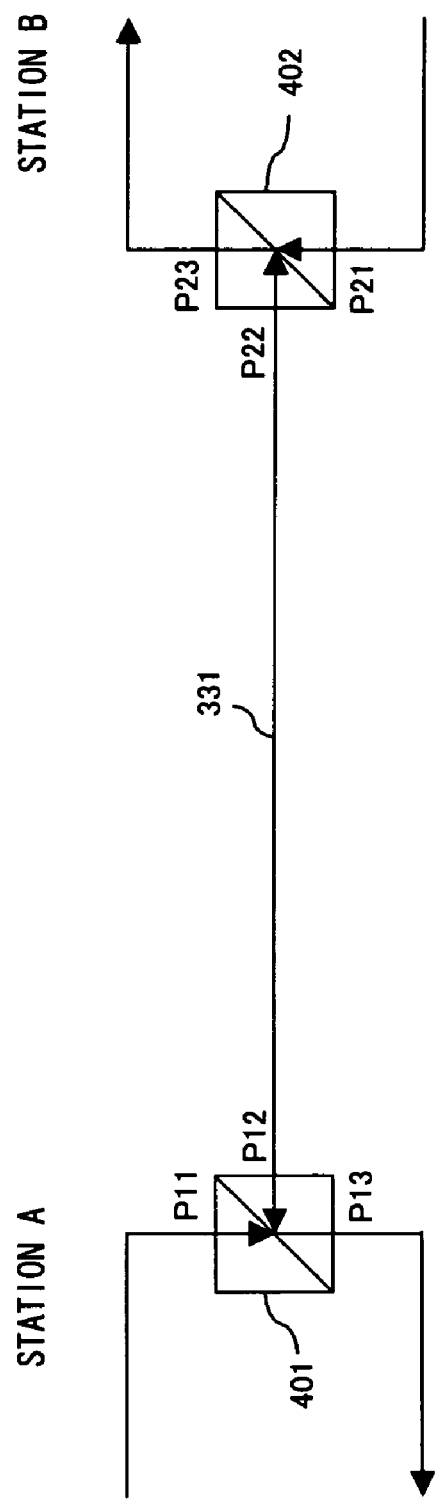
FIG. 4 shows a method for accomplishing a bidirectional communication.

FIG. 4 shows a method for carrying out a bidirectional communication between the stations A and B shown by FIG. 3 by using the optical fiber 331. The stations A and B comprise wavelength filters 401 and 402, respectively, for outputting incident light selectively depending on a wavelength.

The wavelength filter 401 outputs, from a port P12 to the optical fiber 331, incident wavelength light to a port P11 for the direction toward the station B, and outputs, from a port P13, incident light to the port P12 from the optical fiber 331. Meanwhile, the wavelength filter 402 outputs, from a port P22 to the optical fiber 331, incident wavelength light to a port P21 for the direction toward the station A, and outputs, from a port P23, incident light to the port P22 from the optical fiber 331.

As described above, the use of wavelength filters 401 and 402 enables a separation of light for each direction of communication. Likewise, a bidirectional communication between the stations B and C shown by FIG. 3 will be accomplished.

Figure 5:
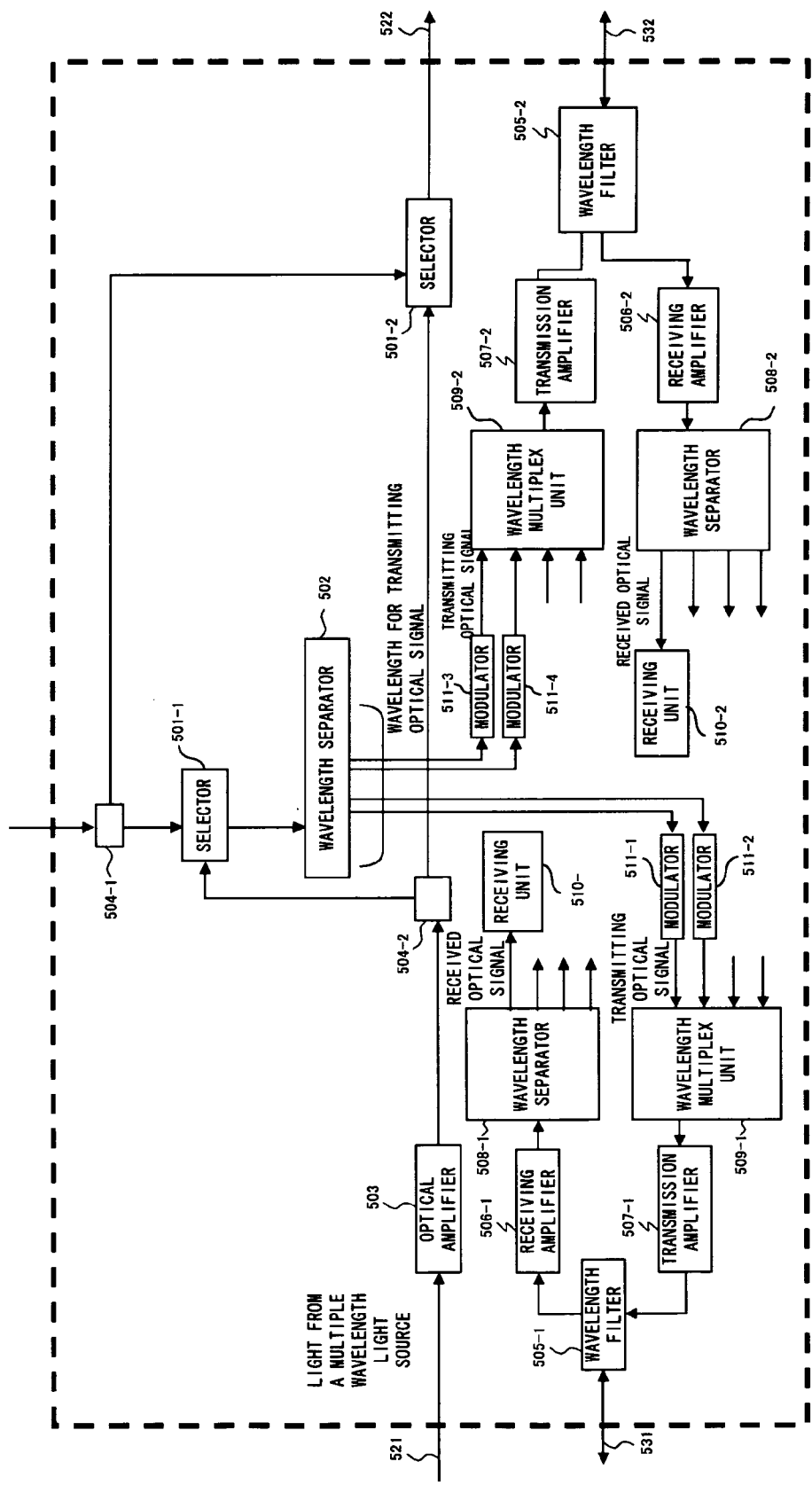
FIG. 5 shows a comprisal of a first transmission apparatus.

FIG. 5 shows a comprisal of the transmission apparatus installed in the each station shown by FIG. 3. The transmission apparatus shown by FIG. 5 comprises selectors 501-1 and 501-2, wavelength separation units 502, 508-1 and 508-2, an optical amplifier 503, optical couplers 504-1 and 504-2, wavelength filters 505-1 and 505-2, receiving amplifiers 506-1 and 506-2, transmission amplifiers 507-1 and 507-2, wavelength multiplexing units 509-1 and 509-2, receiving units 510-1 and 510-2, and modulators 511-1 through 511-4.

Among the above described, the optical couplers 504-1 and 504-2 correspond to the optical couplers 311 through 313 shown by FIG. 3, and the wavelength filters 505-1 and 505-2 correspond to the wavelength filters 401 and 402 shown by FIG. 4.

Incidentally, FIG. 5 shows that only one receiving unit is equipped at the output of the wavelength separation units 508-1 and 508-2, respectively, and only two modulators at the input for the wavelength multiplexing units 509-1 and 509-2, respectively, both for simplicity. Actually, the number of receiving units and modulators, respectively, the same as that of wavelengths of the WDM light will be furnished, however.

If a multiple wavelength light source supply apparatus 301 is installed in the local station as with the station A, the optical coupler 504-1 branches multiple wavelength light supplied therefrom into two parts and outputs the respective parts to the selectors 501-1 and 501-2.

The optical amplifier 503 amplifies incident multiple wavelength light from an optical fiber 521 to output to the optical coupler 504-2 which then branches the multiple wavelength light into two parts and outputs the respective parts to the selectors 501-1 and 501-2.

The selector 501-1 selects either the multiple wavelength light from the optical coupler 504-1 (station A) or the one from the optical coupler 504-2 (station B and C) to output to the wavelength separation unit 502. The selector 501-2 selects either the multiple wavelength light from the optical coupler 504-1 (station A) or the one from the optical coupler 504-2 (station B and C) to output to an optical fiber 522.

The wavelength separation unit 502 separates the multiple wavelength light from the selector 501-1 into respective wavelengths for use in the optical signal transmission, outputs the lights to be used for transmitting in the direction of the incident multiple wavelength light (i.e., leftward) to the modulators 511-1 and 511-2, while outputs the lights to be used for transmitting in the direction of the multiple wavelength light emitting from (i.e., rightward) to the modulators 511-3 and 511-4.

The modulators 511-1 and 511-2 respectively generate optical signals by modulating the lights from the wavelength separation unit 502 by a transmission data string to output to the wavelength multiplexing unit 509-1 which in turn generates WDM light by multiplexing the optical signals from a plurality of modulators including the modulators 511-1 and 511-2 to output to the transmission amplifier 507-1. The transmission amplifier 507-1 amplifies the WDM light from the wavelength multiplexing unit 509-1 to output to the wavelength filter 505-1.

The wavelength filter 505-1 outputs the WDM light from the transmission amplifier 507-1 to an optical fiber 531, and outputs the incident WDM light from the optical fiber 531 to the receiving amplifier 506-1 which then amplifies the WDM light from the wavelength filter 505-1 to output to the wavelength separation unit 508-1. The wavelength separation unit 508-1 separates the WDM light from the receiving amplifier 506-1 into optical signals of respective wavelengths to output to a plurality of receiving units including the receiving unit 510-1 which then converts the optical signals from the wavelength separation unit 508-1 into electrical signals.

As described above, the transmission apparatus carries out a bidirectional communication between the optical fiber 531 while using the multiple wavelength light. The operation of bidirectional communication between the optical fiber 532 is the same as with the optical fiber 531.

Figure 6:
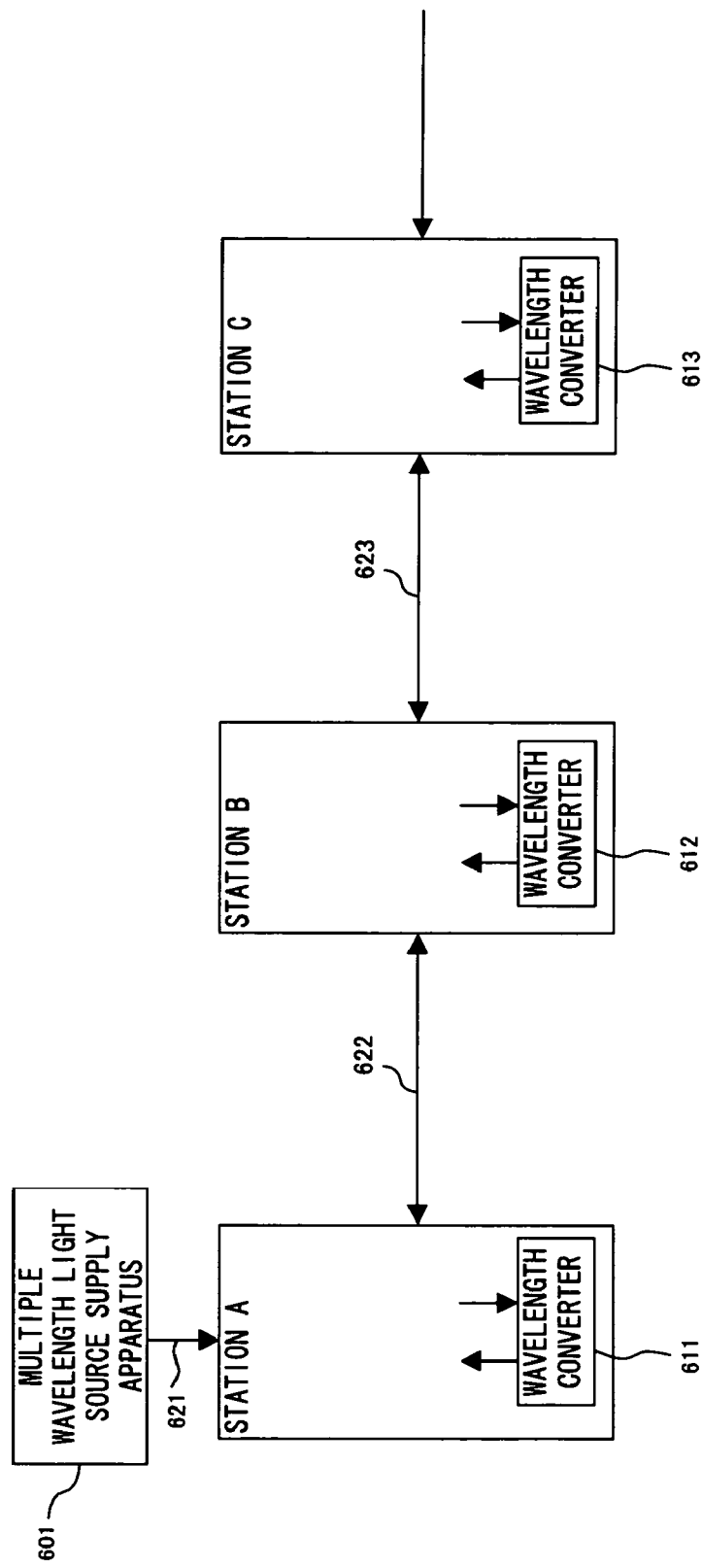
FIG. 6 shows a connection by one optical fiber.

The next description is about a method for supplying multiple wavelength light and accomplishing an optical communication by interconnecting adjacent communication stations by one optical fiber as shown by FIG. 6.

In this case the multiple wavelength light source supply apparatus 601 installed in the station A generates reference multiple wavelength light by multiplexing multiple wavelength lights for the up and down directions to supply the stations A through C by way of optical fibers 621 through 623. For instance, the bands of the reference multiple wavelength light are to use the lights of the mutually different bands for optical communication between the leftward and rightward directions.

The stations A through C let respective wavelength converters 611 through 613 convert the wavelengths of the supplied multiple wavelength light in the lump to generate lights of wavelengths which are different from the original wavelengths, followed by carrying out communications by way of optical fibers 622 and 623 by using the converted lights. Therefore, each wavelength of the WDM light used for communication is always different from each wavelength of multiple wavelength light propagating itself in the same optical fiber.

The wavelength converters 611 through 613 utilize a non-linear device (i.e., wavelength shift device), such as PPLN, capable of converting a plurality of wavelengths in the lump. A use of such wavelength shift device makes it possible to manage invariably the wavelength of light used by each communications station for the communication by multiple wavelength light as a reference and decide uniformly on a wavelength grid.

Figure 7:
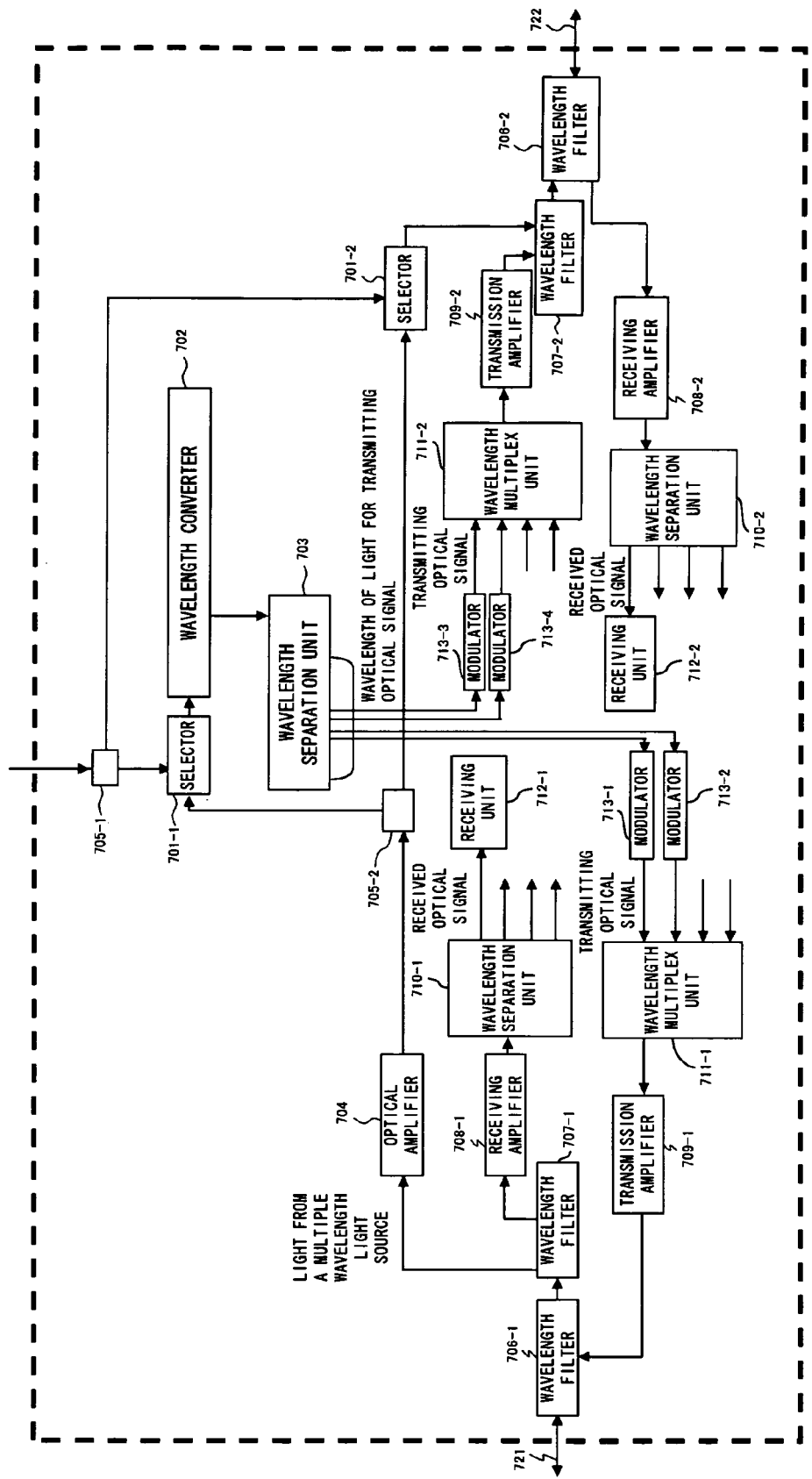
FIG. 7 shows a comprisal of a second transmission apparatus.

FIG. 7 shows a comprisal of the transmission apparatus installed in each station shown by FIG. 6. The transmission apparatus shown by FIG. 7 comprises selectors 701-1 and 701-2, a wavelength converter 702, wavelength separation units 703, 710-1 and 710-2, an optical amplifier 704, optical couplers 705-1and 705-2, receiving amplifiers 708-1 and 708-2, transmission amplifiers 709-1 and 709-2, wavelength multiplexing units 711-1 and 711-2, receiving units 712-1 and 712-2, and modulators 713-1 through 713-4.

Incidentally, the same number of receiving units as that of the wavelengths of WDM light will actually be equipped for the output of the wavelength separation units 710-1 and 710-2, and the number of modulators will likewise be equipped for the input to the wavelength multiplexing units 711-1 and 711-2.

If a multiple wavelength light source supply apparatus 601 is installed in the local station as with the station A, the optical coupler 705-1 branches multiple wavelength light supplied therefrom into two parts and outputs the respective parts to the selectors 701-1 and 701-2.

The wavelength filter 706-1 outputs WDM light from the transmission amplifier 709-1 to an optical fiber 721 and outputs incident light from the optical fiber 721 to the wavelength filter 707-1 which then separates the light from the wavelength filter 706-1 into multiple wavelength light and WDM light, and outputs the former to the optical amplifier 704 and the latter to the receiving amplifier 708-1.

The optical amplifier 704 amplifies the multiple wavelength light from the wavelength filter 707-1 to output to the optical coupler 705-2 which then branches the multiple wavelength light into two parts to output the respective parts to the selectors 701-1 and 701-2.

The selector 701-1 selects either the multiple wavelength light from the optical coupler 705-1 (station A) or the one from optical coupler 705-2 (stations B and C) to output to the wavelength converter 702. The selector 701-2 selects either the multiple wavelength light from the optical coupler 705-1 (station A) or the one from the optical coupler 705-2 (stations B and C) to output to the wavelength filter 707-2.

The wavelength converter 702 shifts all wavelengths of the multiple wavelength light from the selector 701-1 in the lump with the wavelength intervals being maintained and outputs the shifted multiple wavelength light to the wavelength separation unit 703 which then separates the shifted multiple wavelength light into respective wavelengths for use in the optical signal transmission, and output the light for transmitting leftward to the modulators 713-1 and 713-2, while the light for transmitting rightward to the modulators 713-3 and 713-4.

The wavelength filter 707-2 multiplexes the multiple wavelength light from the selector 701-2 and the WDM light from the transmission amplifiers 709-2 to output to the wavelength filter 706-2 which then outputs the light from the wavelength filter 707-2 to an optical fiber 722 and outputs the incident WDM light therefrom to the receiving amplifier 708-2.

The operations by the receiving amplifier 708, transmission amplifier 709, wavelength separation unit 710, wavelength multiplexing unit 711, receiving unit 712 and modulator 713 are the same as in the case of FIG. 5. As described above, the transmission apparatus transmits multiple wavelength light and WDM light through one optical fiber.

Incidentally, in FIG. 6, if a communication is severed in an optical fiber connecting between stations due to a failure, communications in stations downstream the failed point becomes impossible because a supply of multiple wavelength light is cut off therein. Accordingly, it is conceivable to supply multiple wavelength lights bidirectional by transmitting it in both directions in order to secure the reliability of communication even in the aforementioned case.

FIG. 8 shows a comprisal of such a transmission apparatus, which is configured to divide the band of reference multiple wavelength light into two bands, transmits a multiple wavelength light of the one band B1 to the right direction by way of an optical fiber 823, and transmits multiple wavelength light of the other band B2 to the left direction by way of an optical fiber 821; also to generate WDM light to be outputted to the optical fiber 821 by utilizing the incident multiple wavelength light of the band B1 from the optical fiber 821.

Figure 9:
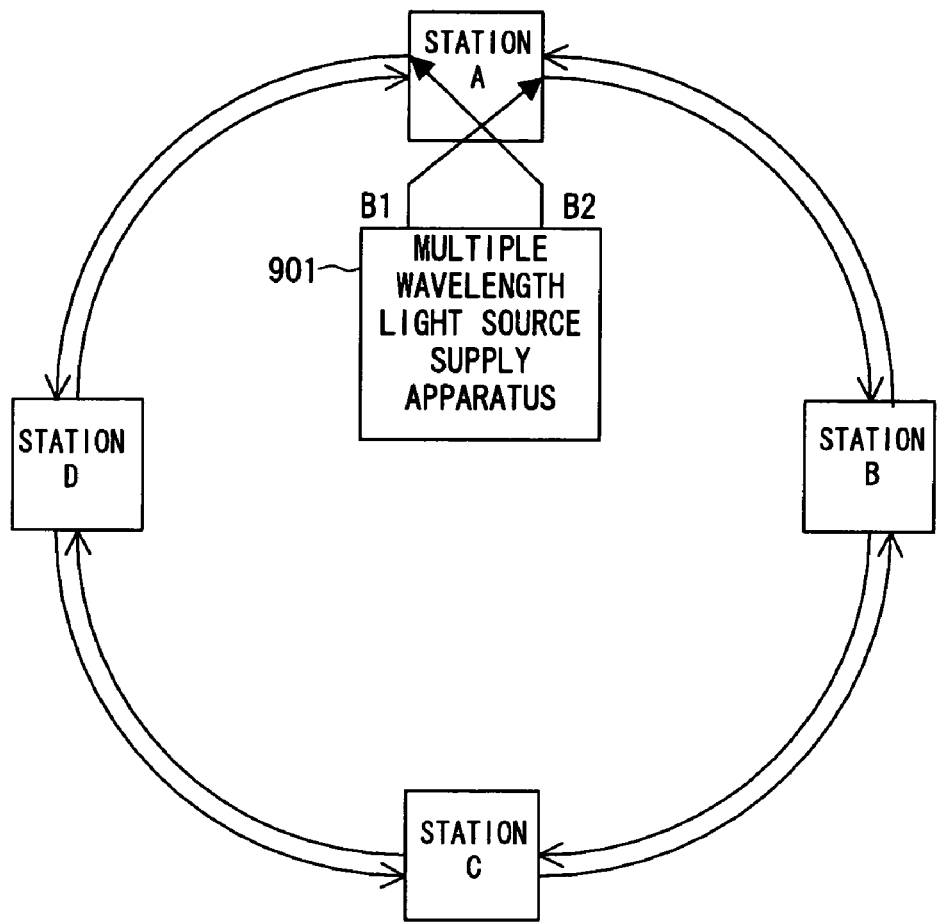
FIG. 9 shows a ring configuration.
Figure 10:
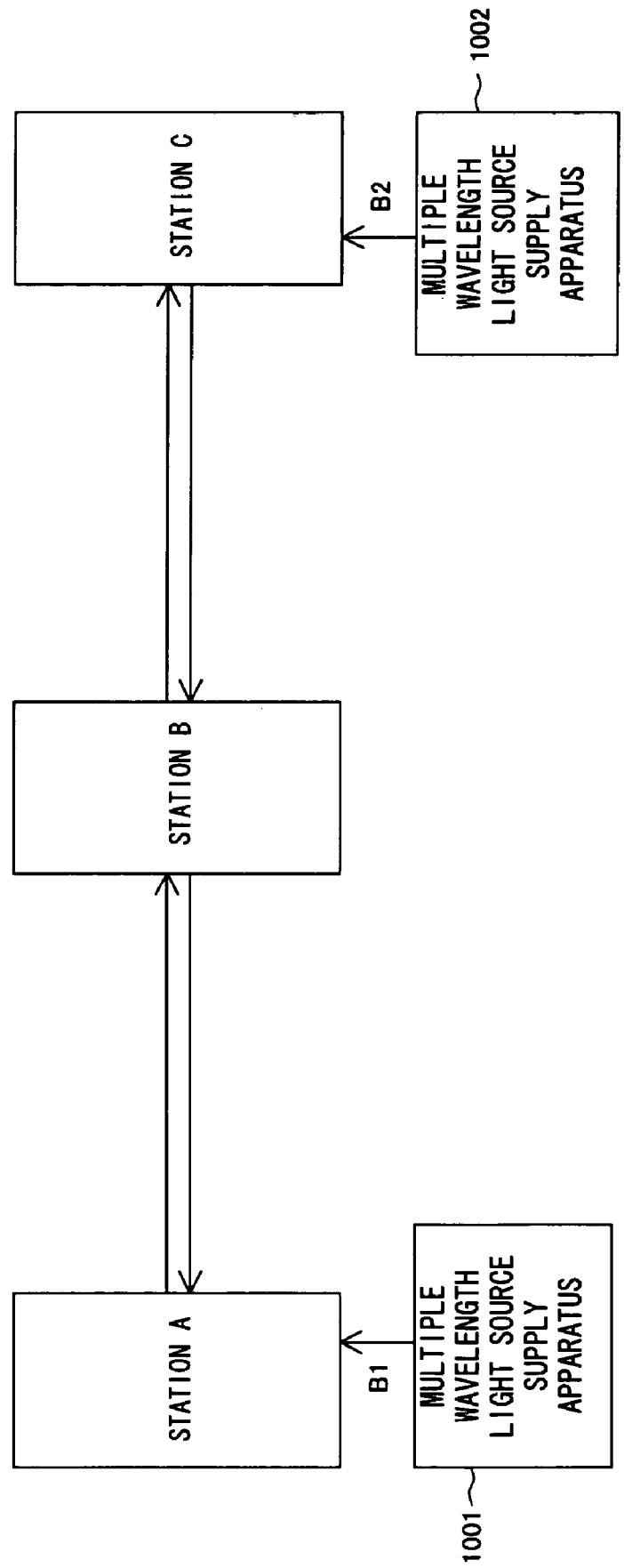
FIG. 10 shows a back to back type configuration.

In this case the configuration of the WDM transmission system becomes as shown either by FIGS. 9 or 10. A ring configuration shown by FIG. 9 lets the station A install a multiple wavelength light source supply apparatus 901, the adjacent communications stations be interconnected by one optical fiber, and the stations A through D form a ring transmission system. The multiple wavelength lights of the bands B1 and B2 outputted from the multiple wavelength light source supply apparatus 901 propagate themselves clockwise (CW) and counter clockwise (CCW), respectively, to supply each station so as to use for transmitting optical signals CCW and CW, respectively.

The "back to back" configuration shown by FIG. 10, on the other hand, lets the end terminals A and C install multiple wavelength light source supply apparatuses 1001 and 1002, respectively, for the wavelength bands B1 and B2, respectively, and the adjacent communications stations be interconnected by one optical fiber. The multiple wavelength light of the band B1 outputted from the multiple wavelength light source supply apparatus 1001 is propagated rightward for supplying the each station so as to use for the leftward communication. Meanwhile, the multiple wavelength light of the band B2 outputted from the multiple wavelength light source supply apparatuses 1002 is propagated leftward for supplying the each station so as to use for the rightward communication.

According to the configuration shown by FIGS. 9 or 10, each station is enabled to continue an optical signal transmission by using the supplied multiple wavelength light even if an optical fiber communication is interrupted, because the multiple wavelength light is supplied from the opposite direction as well. Therefore, it is possible to maintain reliability as close as the conventional WDM transmission system which uses one light source for each wavelength.

The transmission apparatus shown by FIG. 8 comprises selectors 801-1 through 801-4, a wavelength converter 802, wavelength separation units 803-1, 803-2, 811-1 and 811-2, optical amplifiers 804-1 and 804-2, optical couplers 805-1 through 805-4, wavelength filters 806-1, 806-2, 807-1, 807-2, 808-1 and 808-2, receiving amplifiers 809-1 and 809-2, transmission amplifiers 810-1 and 810-2, wavelength multiplexing units 811-1 and 811-2, receiving units 813-1 and 813-2, and modulators 814-1 through 814-4.

Incidentally, the same number of receiving units as that of the wavelengths of WDM light will actually be equipped for the output of the wavelength separation units 811-1 and 811-2, and likewise the number of modulators will be equipped at the input to the wavelength multiplexing units 812-1 and 812-2.

If a multiple wavelength light source supply apparatus is installed in the local station as in the case of the station A shown by FIG. 9 and the stations A and C shown by FIG. 10, the optical coupler 805-1 branches multiple wavelength light of the band B1 supplied from the multiple wavelength light source supply apparatus into two parts and outputs the respective parts to the selectors 801-1 and 801-2. And the optical coupler 805-3 branches multiple wavelength light of the band B2 supplied from the multiple wavelength light source supply apparatus into two parts and outputs the respective parts to the selectors 801-3 and 801-4.

The wavelength filter 806-1 outputs the light from the wavelength filter 808-1 to the optical fiber 821 and outputs the incident light therefrom to the wavelength filter 807-1 which then separates the light from the wavelength filter 806-1 into multiple wavelength light of the band B1 and WDM light to output the former to the optical amplifier 804-1 and the latter to the receiving amplifier 809-1.

The optical amplifier 804-1 amplifies the multiple wavelength light from the wavelength filter 807-1 to output to the optical coupler 805-2 which then branches the multiple wavelength light into two parts to output the respective parts to the selectors 801-1 and 801-2.

The selector 801-1 selects either the multiple wavelength light of the band B1 from the optical coupler 805-1 or the one of the band B1 from the optical coupler 805-2 and outputs it to the wavelength converter 802. The selector 801-2 selects either the multiple wavelength light of the band B1 from the optical coupler 805-1 or the one of the band B1 from the optical coupler 805-2 and outputs it to the wavelength filter 808-2.

The wavelength filter 808-2 multiplexes the multiple wavelength light of the band B1 from the selector 801-2 and the WDM light from the transmission amplifier 810-2, and outputs the product to the wavelength filter 806-2 which then outputs it to the optical fiber 822 and outputs the incident light therefrom to the wavelength filter 807-2.

The wavelength filter 807-2 separates the light from the wavelength filter 806-2 into multiple wavelength light of the band B2 and WDM light, and outputs the former to the optical amplifier 804-2 and the latter to the receiving amplifier 809-2.

The optical amplifier 804-2 amplifies the multiple wavelength light from the wavelength filter 807-2 to output to the optical coupler 805-4, while the optical coupler 805-4 branches the multiple wavelength light into two parts to output the respective parts to the selectors 801-3 and 801-4.

The selector 801-3 selects either the multiple wavelength light of the band B2 from the optical coupler 805-3 or the one of the band B2 from the optical coupler 805-4, and outputs it to the wavelength converter 802. The selector 801-4 selects either the multiple wavelength light of the band B2 from the optical coupler 805-3 or the one of the band B2 from the optical coupler 805-4, and output it to the wavelength filter 808-1.

The wavelength filter 808-1 multiplexes the multiple wavelength light of the band B2 from the selector 801-4 with the WDM light from the transmission amplifier 810-1 to output to the wavelength filter 806-1.

On the other hand, the wavelength converter 802 shifts all the wavelengths of the multiple wavelength light of the band B1 from the selector 801-1 in the lump with the wavelength intervals being maintained, outputs the shifted multiple wavelength light to the wavelength separation unit 803-1, shifts all the wavelengths of the multiple wavelength light of the band B2 from the selector 801-3 likewise, and outputs the shifted multiple wavelength light to the wavelength separation unit 803-2.

The wavelength separation unit 803-1 separates the shifted multiple wavelength light of the band B1 into respective wavelengths for use in an optical signal transmission to output to the modulators 814-1 and 814-2. And the wavelength separation unit 803-2 separates the shifted multiple wavelength light of the band B2 into respective wavelengths for use in an optical signal transmission to output to the modulators 814-3 and 814-4.

The operations by the receiving amplifier 809, transmission amplifier 810, wavelength separation unit 811, wavelength multiplexing unit 812, receiving unit 813 and modulator 814 are the same as in the case of FIG. 5. As described above, the transmission apparatus bidirectionally transmits multiple wavelength light and WDM light through one optical fiber.

While the configuration shown by FIG. 10 lets the two communications stations at the end install the multiple wavelength light source supply apparatuses, respectively, an actual WDM transmission system may install no less than three multiple wavelength light source supply apparatuses in the appropriate distances from each other.

Figure 1C:
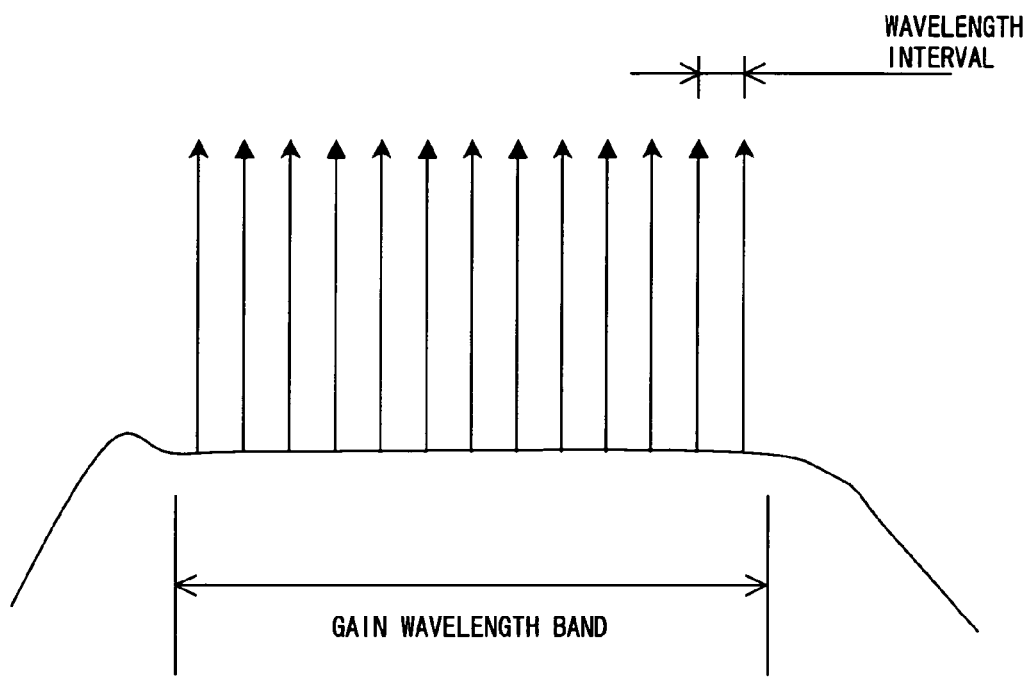
FIG. 1C shows a gain wavelength band.
Figure 1D:
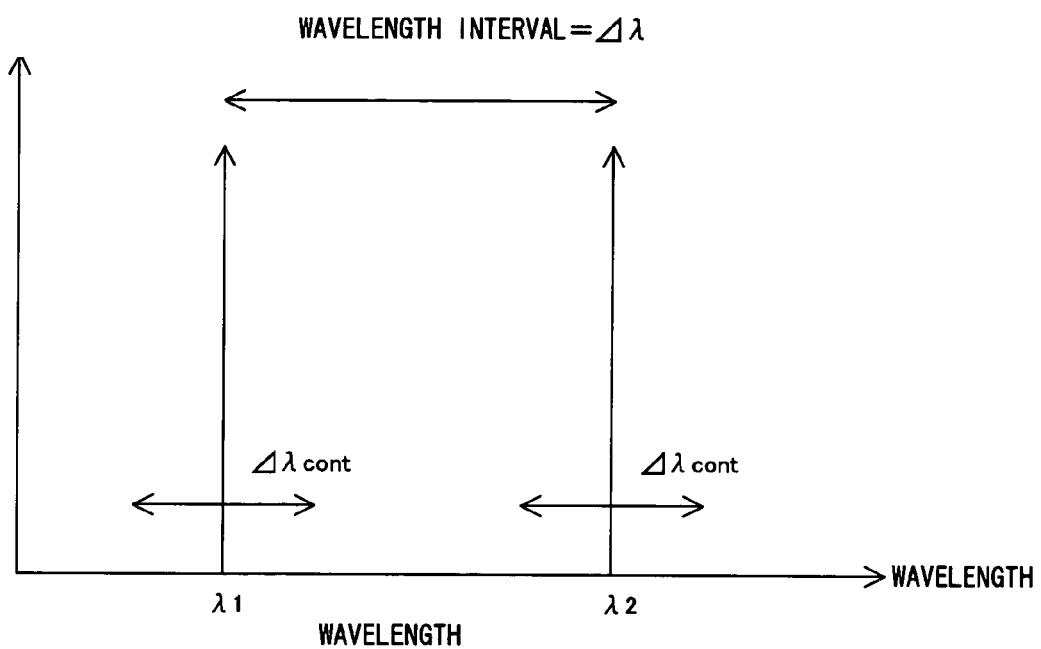
FIG. 1D shows a variation in a wavelength accuracy.
Figure 1F:
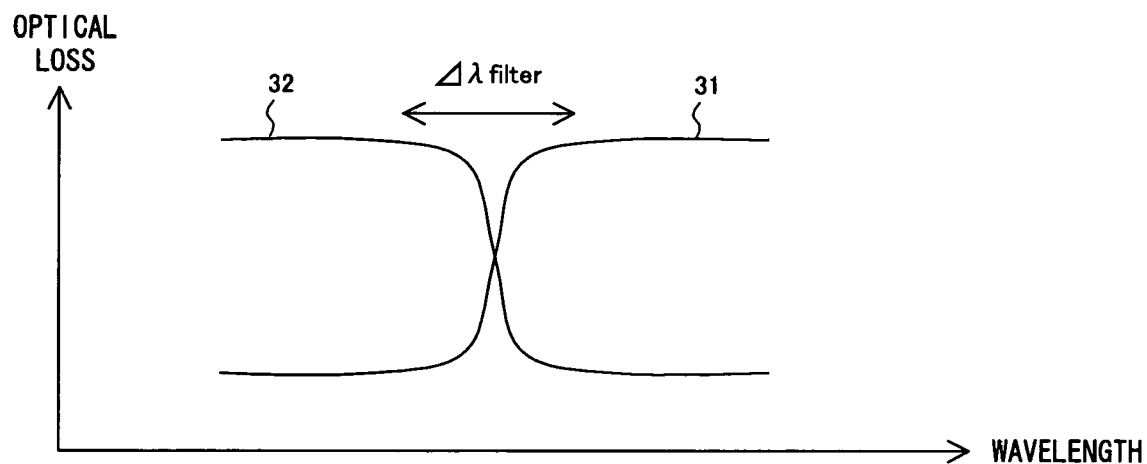
FIG. 1F shows a pass characteristic of a wavelength filter.
Figure 1G:
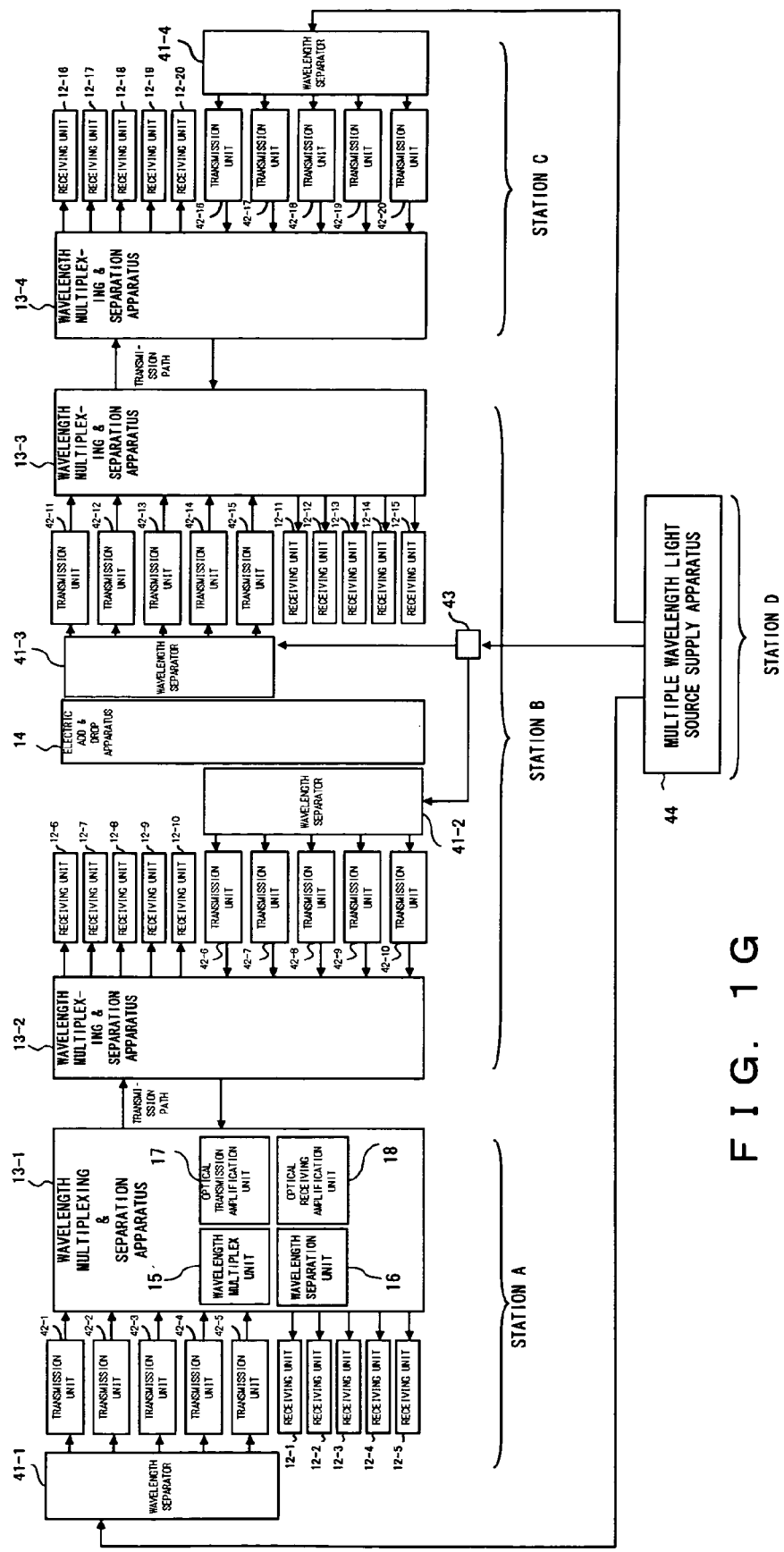
FIG. 1G shows a configuration of WDM transmission system using a multiple wavelength light source.
Figure 1H:
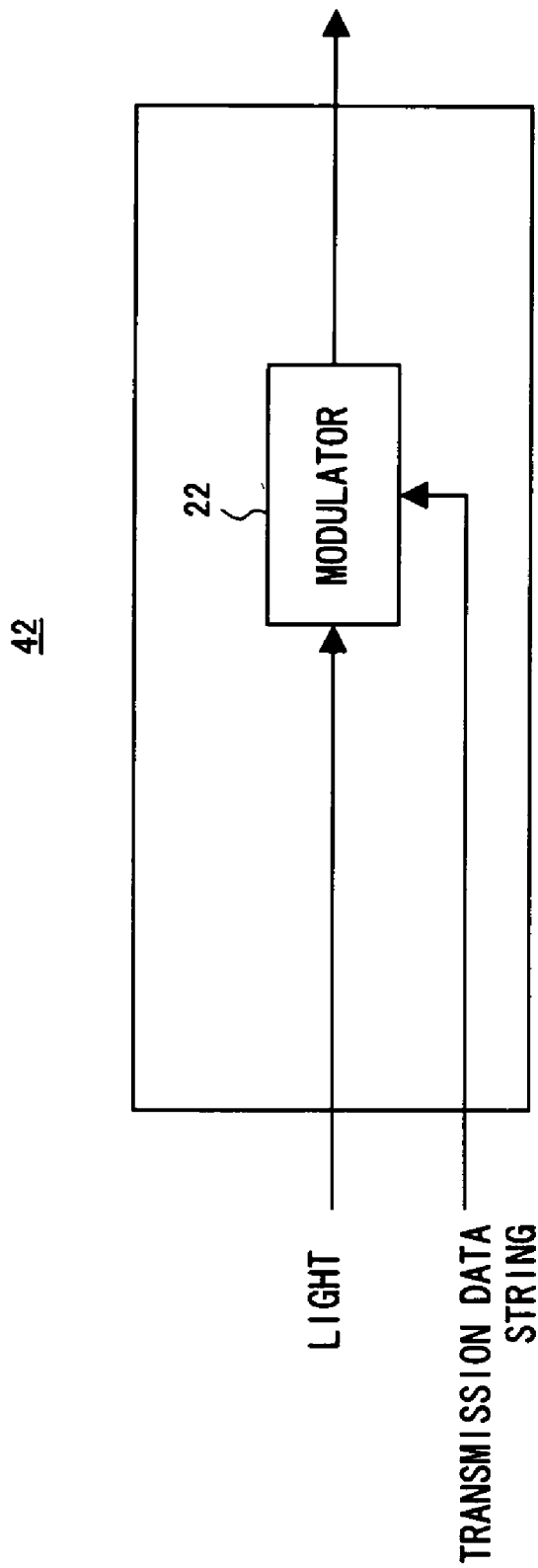
FIG. 1H shows a configuration of a second transmission unit.

The next description is about a method for maintaining a wavelength accuracy of multiple wavelength light source. In the WDM transmission system, the control is preferred to optimize the peak of each oscillation wavelength for use in communications as shown by FIGS. 1C through 1E. Accordingly, the control is to select one or a plurality of wavelengths from among those supplied by multiple wavelength light source for adjustment, and to control a wavelength multiplexing/separation unit so as to eliminate a mutual shift among pass wavelength characteristics of the wavelength multiplexing/separation unit comprised by each communications station by using the wavelength.

It is possible to adjust the internal filters sensitively by selecting these wavelengths for adjustment nearby the border of wavelength grid of the wavelength multiplexing/separation unit.

At the same time, it is also possible to make a wavelength interval and absolute value of the multiple wavelength light source maintain an appropriate shift at all time in the state of each wavelength multiplexing/separation unit being controlled in this way. In this case, a limitation by a wavelength error is improved by each station notifying the multiple wavelength light source supply apparatus of monitor information about the wavelength(s) for adjustment, and by controlling the supplied multiple wavelength light in the lump.

Figure 11:
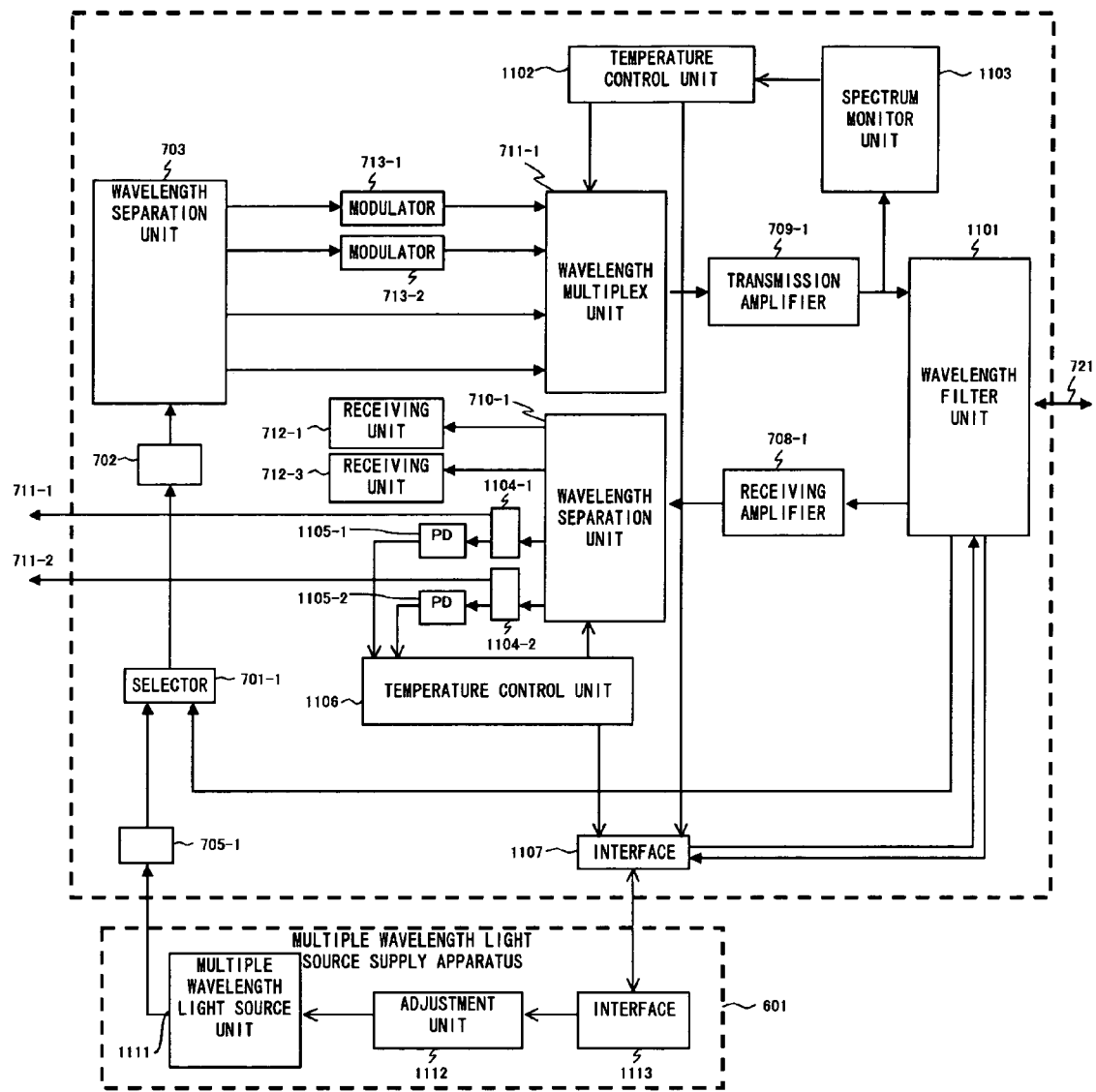
FIG. 11 shows a comprisal for maintaining a wavelength accuracy.

FIG. 11 shows example comprisals of a transmission apparatus installed in each station, and a multiple wavelength light source supply apparatus, for carrying out such control in the WDM transmission system shown by FIGS. 6 and 7. A wavelength filter unit 1101 shown by FIG. 11 corresponds to the wavelength filters 706-1 and 707-1, optical amplifier 704 and optical coupler 705-2, all shown by FIG. 7.

In this example, a transmission apparatus additionally comprises, as its components, temperature control units 1102 and 1106, a spectrum monitor unit 1103, optical couplers 1104-1 and 1104-2, light detectors (PD) 1105-1 and 1105-2, and an interface 1107, with a multiple wavelength light source supply apparatus 601 comprising a multiple wavelength light source unit 1111, an adjustment unit 1112 and an interface 1113.

In FIG. 11, the comprisal is only shown for the side of an optical fiber 721. The comprisal for the side of an optical fiber 722 is the same.

The pass wavelength characteristics of the wavelength multiplexing unit 711-1 and wavelength separation unit 710-1 vary with temperature in the direction of wavelength. Therefore, it is possible to adjust the pass wavelength characteristics by controlling the temperatures of the wavelength multiplexing unit 711-1 and wavelength separation unit 710-1 by the temperature control units 1102 and 1106, respectively.

As for the wavelength for adjustment, two wavelengths, i.e., first and second wavelengths, are selected from among the shifted plurality of wavelengths by the wavelength converter 702. The second wavelength is preferably selected as farther as possible from the first wavelength. Connections are such that these lights of the selected wavelengths go through a receiving station to reach the next station.

Therefore, the wavelength separation unit 710-1 separates the light from the receiving amplifier 708-1 into lights of the respective wavelengths, followed by outputting the lights of the first and second wavelengths to the optical couplers 1104-1 and 1104-2, respectively. The optical couplers 1104-1 and 1104-2 branch the lights respectively received from the wavelength separation unit 710-1 into two parts, respectively, and output the one part to the wavelength multiplexing unit 711-1 on the opposite side, while output the other part to the light detectors 1105-1 and 1105-2, respectively.

The light outputted to the wavelength multiplexing unit 711-2 is transmitted to the next station by way of the optical fiber 722. Thus, the lights of the first and second wavelengths will be transmitted from a station to the next without carrying any data, as described above.

If the multiple wavelength light source supply apparatus 601 is installed in the local station as in the case of station A shown by FIG. 6, a multiple wavelength light outputted from the multiple wavelength light source unit 1111 enters the transmission apparatus in which event the wavelength separation unit 703 separates the multiple wavelength light from the wavelength converter 702 into lights of the respective wavelengths and outputs the lights of first and second wavelengths to the wavelength multiplexing unit 711-1 without going through a modulator.

The light detectors 1105-1 and 1105-2 detect power levels of the received lights of first and second wavelengths, respectively, to output to the temperature control unit 1106 which then adjust the temperature of the wavelength separation unit 710-1 so that the power level of the first wavelength outputted from the light detector 1105-1 indicates a maximum.

The spectrum monitor unit 1103 monitors the spectrum of the light outputted from the transmission amplifier 709-1 and outputs the monitor information to the temperature control unit 1102 which then adjusts the temperature of the wavelength multiplexing unit 711-1 so that the peak value of the first wavelength monitored by the spectrum monitor unit 1103 indicates a maximum.

A shift in the absolute value of pass wavelength in the wavelength multiplexing & separation units comprised by the all stations is compensated by the adjustments carried by the temperature control units 1102 and 1106. In this event, it is necessary to confirm that the selected first wavelength goes through a certain port of the wavelength multiplexing & separation units comprised by the all stations.

The temperature control unit 1102 transmits the monitor information from the spectrum monitor unit 1103 to the multiple wavelength light source supply apparatus 601 by way of the interface 1107, while the temperature control unit 1106 transmits the power levels of the first and second wavelengths to the multiple wavelength light source supply apparatus 601 by way of the interface 1107.

If a multiple wavelength light source supply apparatus 601 is not installed in the local station, the above described pieces of information will be transferred to the wavelength filter unit 1101 followed by being transmitted to the station, where a multiple wavelength light source supply apparatus 601 is installed, by way of the optical fiber 722.

In the multiple wavelength light source supply apparatus 601, the information received at the interface 1113 is transferred to the adjustment unit 1112 which then adjusts the temperature of the multiple wavelength light source unit 1111 so as to minimize an optical loss of the lights of the first and second wavelengths passing through the wavelength multiplexing/separation unit comprised by each station indicating a minimum based on the transferred information. By this, the pass wavelength characteristic of the wavelength filter inside the multiple wavelength light source unit 1111 changes, thereby adjusting an oscillation wavelength interval of the multiple wavelength light and an absolute value of the each wavelength. Also in this event, it is necessary to confirm that the selected first wavelength goes through a certain port of the wavelength multiplexing & separation units comprised by the all stations.

The interface 1113 receives information collected remotely via a monitoring control signal line, et cetera, on a required basis, and the multiple wavelength light source unit 1111 is controlled based on the received information. The usual method is to receive an optical signal of a wavelength far from the wavelength band of WDM light by being multiplexed therewith.

Also the transmission apparatus installed in each station confirms whether or not the first wavelength goes through a certain port and carries out the control of the wavelength multiplexing/separation unit autonomously while letting the spectrum monitor unit 1103, light detectors 1105-1 and 1105-2 monitor the light of the first wavelength.

The first wavelength is preferably selected based on a stability of the output characteristic and wavelength in terms of change in wavelength interval. Specifically, the preference is a selection of base wavelength when the multiple wavelength light source unit 1111 carries out a multiple wavelength oscillation.

The WDM transmission systems shown by FIGS. 3, 9 and 10 are capable of controlling for maintaining a wavelength accuracy of multiple wavelength light as in the case of FIG. 11. The final station at which the light of wavelength for adjustment reaches is the same as the initiating station A in a ring configuration as shown by FIG. 9, while the final station is a different station in a back to back configuration as shown by FIG. 10.

The present embodiment shows the configurations of three or four communications stations constituting a WDM transmission system as described above, a larger number of stations actually will constitute the system, however.

Incidentally, the reference multiple wavelength light may be divided into many bands instead of two, with one group bundling some of the bands together and the other bundling the rest. In such a case, the two groups will be used for optical signal transmissions leftward and rightward, respectively.

What is claimed is:

1. A transmission apparatus for transmitting an optical signal through a wavelength division multiplexing by using multiple wavelength light supplied from a multiple wavelength light source, comprising:

a multiple wavelength light output device to output one of multiple wavelength light generated by the multiple wavelength light source and incident multiple wavelength light from a first multiple wavelength light transmission path, to a second multiple wavelength light transmission path coupled to a first adjacent transmission apparatus;

a multiple wavelength light separation device to separate the multiple wavelength light into lights of respective wavelengths;

a modulation device to generate an optical signal by modulating each of the separated lights of the respective wavelengths by a transmission data string; and a wavelength multiplexing device to multiplex a plurality of optical signals to output to an optical signal transmission path coupled to one of the first adjacent transmission apparatus and a second adjacent transmission apparatus, wherein the multiple wavelength light output device to output the one of the generated multiple wavelength light and the incident multiple wavelength light to the second multiple wavelength light transmission path and the multiple wavelength light separation device.

2. The transmission apparatus according to claim 1, further comprising
a wavelength separation device to separate wavelength division multiplexing light into lights of respective wavelengths, and
a wavelength filter device to output a wavelength division multiplexing light outputted from said wavelength multiplexing device to said optical signal transmission path and to output incident wavelength division multiplexing light from the optical signal transmission path to the wavelength separation device.

3. A transmission apparatus for transmitting an optical signal through a wavelength division multiplexing by using multiple wavelength light supplied from a multiple wavelength light source, comprising:
a multiple wavelength light output device to output incident multiple wavelength light from one of the multiple wavelength light source and a first transmission path, to a second transmission path coupled to an adjacent transmission apparatus;
a conversion device to convert respective wavelengths of the multiple wavelength light in a lump;
a multiple wavelength light separation device to separate the converted multiple wavelength light into lights of respective wavelengths;
a modulation device to generate an optical signal by modulating each of the separated lights of respective wavelengths by a transmission data string; and
a wavelength multiplexing device to multiplex a plurality of optical signals having different wavelengths to output to the second transmission path,
wherein the incident multiple wavelength light does not include data, the multiple wavelength light output device outputs the incident multiple wavelength light to the second transmission path and the conversion device, and the conversion device converts all the wavelengths of the multiple wavelength light before being separated into the lights of respective wavelengths.

4. The transmission apparatus according to claim 3, further comprising
a wavelength separation device to separate wavelength division multiplexing light into lights of respective wavelengths, and
a wavelength filter device to output wavelength division multiplexing light outputted from said wavelength multiplexing device to said second transmission path and outputting incident wavelength division multiplexing light from the second transmission path to the wavelength separation device.

5. The transmission apparatus according to claim 4, further comprising
a monitor device to monitor, when light of an adjustment wavelength generated from said multiple wavelength light passes through one of said wavelength multiplexing device and wavelength separation device, the light of the adjustment wavelength after passing, and
a control device to control a characteristic of the one of the wavelength multiplexing device and wavelength separation device so that a monitor value of the light of the adjustment wavelength becomes a maximum.

6. A transmission apparatus for transmitting an optical signal through a wavelength division multiplexing by using multiple wavelength light supplied from a multiple wavelength light source, comprising:
a first multiple wavelength light output device to output incident first multiple wavelength light from one of the multiple wavelength light source and a first transmission path coupled to a first adjacent transmission apparatus, to a second transmission path coupled to a second adjacent transmission apparatus;
a second multiple wavelength light output device to output incident second multiple wavelength light from one of the multiple wavelength light source and the second transmission path, to the first transmission path;
a conversion device to convert respective wavelengths of the first and second multiple wavelength lights in a lump;
a first multiple wavelength light separation device to separate the converted first multiple wavelength light into lights of respective wavelengths;
a second multiple wavelength light separation device to separate the converted second multiple wavelength light into lights of respective wavelengths;
a first modulation device to generate an optical signal by modulating each of the separated lights, separated by the first multiple wavelength light separation device, of respective wavelengths by a transmission data string;
a second modulation device to generate an optical signal by modulating each of the separated lights, separated by the second multiple wavelength light separation device, of respective wavelengths by a transmission data string;
a first wavelength multiplexing device to multiplex a plurality of optical signals having different wavelengths, which have been generated by the first modulation device, to output to the first transmission path; and
a second wavelength multiplexing device to multiplex a plurality of optical signals having different wavelengths, which have been generated by the second modulation device, to output to the second transmission path,
wherein the first and second multiple wavelength light do not include data, the first multiple wavelength light output device outputs the first multiple wavelength light to the second transmission path and the conversion device, the second multiple wavelength light output device outputs the second multiple wavelength light to the first transmission path and the conversion device, and the conversion device converts all the wavelengths of the first or second multiple wavelength light before being separated into the lights of respective wavelengths.

7. The transmission apparatus according to claim 6, further comprising
a first wavelength separation device to separate wavelength division multiplexing light into lights of respective wavelengths;
a second wavelength separation device to separate wavelength division multiplexing light into lights of respective wavelengths;
a first wavelength filter device to output wavelength division multiplexing light outputted from said first wavelength multiplexing device to said first transmission path and outputting incident wavelength division multiplexing light from the first transmission path to the first wavelength separation device; and
a second wavelength filter device to output wavelength division multiplexing light outputted from said second wavelength multiplexing device to said second transmission path and outputting incident wavelength division multiplexing light from the second transmission path to the second wavelength separation device.

8. The transmission apparatus according to claim 7, further comprising
- a first monitor device to monitor, when light of adjustment wavelength generated from said first multiple wavelength light passes through one of said first wavelength multiplexing device and first wavelength separation device, the light of the adjustment wavelength after passing;
- a first control device to control a characteristic of the one of the first wavelength multiplexing device and first wavelength separation device so that a monitor value of the light of the adjustment wavelength becomes a maximum;
- a second monitor device to monitor, when light of adjustment wavelength generated from said second multiple wavelength light passes through one of said second wavelength multiplexing device and second wavelength separation device, the light of the adjustment wavelength after passing; and
- a second control device to control a characteristic of the one of the second wavelength multiplexing device and second wavelength separation device so that a monitor value of the light of the adjustment wavelength becomes a maximum.

* * * * *